(12) United States Patent
Rameau et al.

(10) Patent No.: US 8,798,975 B2
(45) Date of Patent: Aug. 5, 2014

(54) COMPUTER METHOD AND SYSTEM PROVIDING DESIGN OF AN ASSEMBLY MODELED BY A GRAPH

(75) Inventors: Jean-Francois Rameau, Lisses (FR); Laurent Alt, Conflans Saint-Honorine (FR)

(73) Assignee: Dassault Systemes, Velizy Villacoublay (FR)

( * ) Notice: Subject to any disclaimer, the term of this patent is extended or adjusted under 35 U.S.C. 154(b) by 411 days.

(21) Appl. No.: 12/980,694

(22) Filed: Dec. 29, 2010

(65) Prior Publication Data

US 2012/0004891 A1 Jan. 5, 2012

(30) Foreign Application Priority Data

Dec. 31, 2009 (EP) ..................................... 09306355

(51) Int. Cl.
*G06G 7/48* (2006.01)
*G06F 17/50* (2006.01)
*G05B 17/02* (2006.01)

(52) U.S. Cl.
CPC ........ *G06F 17/5095* (2013.01); *G06F 17/5018* (2013.01); *G05B 17/02* (2013.01); *Y02T 10/82* (2013.01)
USPC ...................................... 703/7; 703/6; 703/8

(58) Field of Classification Search
CPC . G06F 17/50; G06F 17/5095; G06F 17/5009; G06F 17/5018; Y02T 10/82; G05B 17/02
USPC ..................................................... 703/6, 7, 8
See application file for complete search history.

(56) References Cited

U.S. PATENT DOCUMENTS

| | | | |
|---|---|---|---|
| 2005/0209829 | A1 | 9/2005 | Binzer et al. |
| 2009/0187881 | A1 | 7/2009 | Feger et al. |

FOREIGN PATENT DOCUMENTS

| | | |
|---|---|---|
| CN | 101126976 A | 2/2008 |
| CN | 101271479 A | 9/2008 |
| CN | 101421729 A | 4/2009 |

OTHER PUBLICATIONS

Kohavi, Ron et al., "Oblivious Decision Trees, Graphs, and Top-Down Pruning", 1995, International Joint Conference on Artificial Intelligence (IJCAI).*
Heine, Christian et al., "Visualization of Barrier Tree Sequences", Sep./Oct. 2006, IEEE Transactions on Visualization and Computer Graphics, vol. 12, No. 5.*

(Continued)

*Primary Examiner* — Dwin M Craig
*Assistant Examiner* — Cedric D Johnson
(74) *Attorney, Agent, or Firm* — Hamilton, Brook, Smith & Reynolds, P.C.

(57) ABSTRACT

The invention provides a computer-implemented method and system intended for designing an assembly of a plurality of objects. The assembly is modeled by a directed acyclic modeling graph having nodes and arcs. Each node represents an object of the assembly. Each arc represents the use of an end node by an origin node. At least one arc is uniquely identified by an identifier. The assembly is further modeled by at least one relation having at least one tuple containing a first chain of at least one identifier. The method comprises determining at least one mapping between the first chain and a second chain of at least one identifier as well as substituting at least one occurrence of the first chain in the tuple of the relation with the second chain. The invention provides a means to repair broken tuples automatically and thus to facilitate design.

14 Claims, 16 Drawing Sheets

(56) References Cited

OTHER PUBLICATIONS

Sinnen, Oliver et al., "A Platform Independent Parallelizing Tool Based on Graph Theoretic Models", 2001, Springer-Verlag Berlin Heidelberg.*

Rekiek, Brahim et al., "Designing Mixed-Product Assembly Lines", Jun. 2000, IEEE Transactions on Robotics and Automation, vol. 16, No. 3, IEEE.*

Whitney, D.E. et al., "Designing Assemblies", 1999, Research in Engineering Design, Springer-Verlag London Limited.*

European Search Report for EP 09 30 6355 dated Apr. 22, 2010.

Noort, A., et al. "Integrating Part and Assembly Modelling", Computer-Aided Design, 34:12, pp. 899-912, Oct. 1, 2002.

Finger, S., et al. "A Transformational Approach to Mechanical Design Using a Bond Graph Grammar", American Society of Mechanical Engineers, Design Engineering Division, vol. 17, pp. 107-116, 1989.

Molli, P., et al. "Using the Transformational Approach to Build a Safe and Generic Data Synchronizer", Proceedings to the International ACM Siggroup Conference Supporting Group-Work—Group '03: Proceedings of the 2003 Association for Computing Machinery, US, pp. 212-220, 2003.

Chinese Search Report dated May 5, 2014 in Chinese Application No. 201010625132.5.

* cited by examiner

For all $a \in V_{\Phi(A)}$ do begin $\quad b := s_{AB}(a)$ $\quad b' := s_{AB'}(a)$ $\quad$ If $b \in V_{\Phi(\tilde{B})}$ and $b' \notin V_{\Phi(\tilde{B})}$ then $\quad\quad s_{B\tilde{B}}(b) := b$ $\quad\quad s_{B'\tilde{B}}(b') := b$ $\quad\quad s_{A\tilde{B}}(a) := b$ $\quad$ Else if $b \notin V_{\Phi(\tilde{B})}$ and $b' \in V_{\Phi(\tilde{B})}$ then $\quad\quad s_{B\tilde{B}}(b) := b'$ $\quad\quad s_{B'\tilde{B}}(b') := b'$ $\quad\quad s_{A\tilde{B}}(a) := b'$ $\quad$ Else if $b \in V_{\Phi(\tilde{B})}$ and $b' \in V_{\Phi(\tilde{B})}$ then $\quad\quad$ If $b = b'$ then (* In this case: $b = b' = a$. *)

$\quad\quad\quad s_{B\tilde{B}}(b) := b$ $\quad\quad\quad s_{B'\tilde{B}}(b') := b'$ $\quad\quad\quad s_{A\tilde{B}}(a) := a$ $\quad\quad$ Else (* Here, there is an ambiguity in the merging process. *)

$\quad\quad$ End if $\quad$ Else if $b \notin V_{\Phi(\tilde{B})}$ and $b' \notin V_{\Phi(\tilde{B})}$ then (* $a \in V_{\Phi(A)}$ is not routed *)

$\quad\quad s_{B\tilde{B}}(b) := \varepsilon$ $\quad\quad s_{B'\tilde{B}}(b') := \varepsilon$ $\quad\quad s_{A\tilde{B}}(a) := \varepsilon$ $\quad$ End if End for

Figure 34

For all $b \in V_{\Phi(B)} - s_{AB}(V_{\Phi(A)})$ do begin
    If $b \in V_{\Phi(\tilde{B})}$ then
        $s_{B\tilde{B}}(b) := b$
    Else
        $s_{B\tilde{B}}(b) := \varepsilon$
    End if
End for

Figure 35

COMPUTER METHOD AND SYSTEM PROVIDING DESIGN OF AN ASSEMBLY MODELED BY A GRAPH

RELATED APPLICATION

This application claims priority under 35 U.S.C. §119 or 365 to European Application No. 09306355.0, filed Dec. 31, 2009.

The entire teachings of the above application(s) are incorporated herein by reference.

FIELD OF THE INVENTION

The invention relates to the field of design of an assembly of objects and collaborative design of an assembly of objects.

BACKGROUND OF THE INVENTION

Typical examples of an assembly are: a complete car, an airplane, a ship, including mechanical and electrical equipment, the inside and/or the outside of a car body structure. The aim of the design of such an assembly is to provide the engineer with a virtual occurrence of the future product in order to ease investigations and alternatives.

When designing a new assembly of objects, the designer typically works with a PLM/CAD system (i.e. Product Life-Cycle Management/Computer Aided Design system). The system contains a database of reference objects, such as parts or assemblies of parts stored beforehand (also possibly created and stored while designing the new assembly).

An assembly is modeled by a reuse graph. A reuse graph (or "re-use" graph) is a labeled directed acyclic graph which captures the reuse schema underlying the assembly. More specifically, a node of a reuse graph corresponds to a reference object or to an assembly of reference objects. For the sake of convenience, in the following no distinction is made between a node and the object to which it corresponds. An arc of a reuse graph is labelled and represents a "use" of the end node of the arc by the origin node of the arc. In other words, a node of a reuse graph is made of uses, i.e. instances, of its child nodes. Reuse graphs are also known as instance graphs.

An example of a reuse graph is represented by FIG. 1. In this example, node a is made of two uses of node b and one use of node c (i.e. the reference object corresponding to node a is made of two instances of the reference object corresponding to node b and one instance of the reference object corresponding to node c). FIG. 1 also tells that node b is made of two uses of node c.

In order to concretely illustrate how a reuse graph models an assembly, let us consider that node a corresponds to a car, node b to an axle of a car, and node c to a wheel. A car uses two axles (front axle and rear axle), corresponding to arcs $u_1$ and $u_2$. Each axle uses two wheels (left wheel and right wheel), corresponding to arcs $u_3$ and $u_4$. Finally, a car uses another wheel which is not used by any axle (spare wheel), corresponding to arc $u_5$.

As shown by the example of FIG. 1, a characteristic of a reuse graph is that its nodes may be used several times. In other words, and in opposition to a tree graph, nodes of a reuse graph may have several parent nodes. Thus, a reuse graph gathers all the information while avoiding duplication of information.

The reuse graph gathers all the information and allows resource saving during storage. However, it is not user friendly for design. For this reason, an unfolded graph is computed from the reuse graph by exploring all the arcs and duplicating reused nodes. The unfolded graph is consequently always a tree graph (i.e. all nodes except the root node have exactly one parent node). It provides a realistic view of the whole assembly because all occurrences of all objects are visible. Furthermore, the unfolded graph may be viewed as a graphical representation of the assembly and all occurrences of all objects are then displayed at exact positions in space. Unfolded graphs are also known as occurrence graphs.

The unfolded graph corresponding to the reuse graph of FIG. 1 is represented in FIG. 2, to which it is now referred.

In order to take into account objects duplications, indexes ((•,1), (•,2), (•,3), (•,4), (•,5)) are associated to arcs ($u_1$, $u_2$, $u_3$, $u_4$, $u_5$) and nodes (a, b, c) of the unfolded graph. This way each symbol of the unfolded graph, including arcs and nodes, is unique. The unfolded graph is however not persistently stored in the system for two reasons. Firstly, duplicated data take more memory space than the reuse graph. This is particularly an issue when designing complex assemblies. Secondly, updating duplicated data is a difficult and costly process because of the exhaustive scan of all the copies. For this reason, only the reuse graph is persistently stored in the system.

Consequently, when unfolding a reuse graph; for example when a designer wants to edit an assembly, indexes are generated on the fly in order to distinguish occurrences of the same reference object during the edition time. Closing and opening again the same assembly will generate different indexes. Furthermore, two designers may want to edit the same assembly at the same time and generate different indexes.

An assembly is further modeled by relations having tuples (i.e. an ordered set of objects within the relations). A typical relation is the distance between two objects. Creating a tuple of such a relation in the concrete illustration provided above in reference to FIG. 1 consists for example in defining a distance between two wheels.

Relations are captured through the unfolded graph. Suppose that the designer creates for the distance relation a tuple having the objects (c,1) and (c, 5) in the example of FIG. 1. They are both a use of reference object c. As explained previously, indexes (•, 1) and (•,5) are not stored persistently. Thus it is not possible to persistently store "distance between (c,1) and (c,5)". Doing so, the system would not find the occurrences of object c to put in relation or may find incorrect occurrences after a close-and-open sequence because there are five occurrences of object c and new indexes are generated each time the reuse graph is unfolded. Moreover, when two users release their design, relations must be stored together with the reuse graph in such a way that, when reading the assembly again, relations of both users are available.

The consequence of these constraints is that a relation must be encoded with symbols of the reuse graph, so that the relation may be stored persistently. The state of the art solution is to name nodes of the unfolded graph using the path of arcs from the root node. For example, node (c,1) is reachable from the root node (a,1) by arcs ($u_1$,1) and ($u_3$,1), so its path is defined by the concatenation of arc symbols ($u_1$,1)($u_3$,1). Then, the name of node (c,1) is obtained from the path ($u_1$,1) ($u_3$,1) by keeping persistent symbols only, which yields $u_1u_3$. A similar reasoning for (c,5) yields $u_2u_3$. Finally, the relation between nodes (c,1) and (c,5) is persistently stored as "relation between $u_1u_3$ and $u_2u_3$". Notice that $u_1u_3$ and $u_2u_3$ define unique paths in the unfolded graph even after changing all indexes. This property guarantees the persistency of the relation after a close-and-open sequence. It also guarantees concurrent creation of relations on the same assembly.

Opening an assembly is performed through two steps. First step is to compute the unfolded graph from the reuse graph. Second step is to find, for each relation and each tuple of the relation, which nodes of the unfolded graph are in the tuple. The algorithm searches in the unfolded graph the path of arcs corresponding to the paths of reuse arcs stored in the tuple. This step is called "update relations". A tuple of a relation that cannot be connected to any node of the unfolded graph (no path matching) is said to be "broken".

A tuple may be broken when the reuse graph modeling an assembly is edited. FIGS. 3-5 illustrate one circumstance where editing a reuse graph leads to a broken tuple.

FIG. 3 is a representation of an unfolded graph of the assembly modeled by the reuse graph of FIG. 1, and further modeled by a relation named Connect having one tuple. A tuple of the relation Connect is a couple of objects mechanically connected. In the example of FIG. 3, the tuple may be coded on non persistent occurrence symbols as Connect[(c, 1),(c,5)], on non persistent path symbols as Connect[($u_1$,1) ($u_3$,1),($u_2$,1)($u_3$,1)], and on persistent path symbols as Connect[$u_1u_3,u_2u_3$]

This tuple may be broken after a change in the reuse graph of FIG. 1. Tuples are coded using paths of arcs of the reuse graph. If this graph is edited, (add, delete or reroute arcs, add, delete nodes, etc.) some paths may not exist any more and tuples coded with these paths are broken. Consequently, rework is needed from the designer to reconnect tuples. For example, suppose that the designer edits the reuse graph in FIG. 1 by adding a new reference product d between a and b, as represented in FIG. 4.

FIG. 5 represents the unfolded edited graph corresponding to the edited reuse graph of FIG. 4. The tuple Connect[$u_1u_3$, $u_2u_3$] is broken because the path $u_1u_3$ does not identify any node of the unfolded graph in FIG. 5. Notice that the path $u_2u_3$ (defined in the context of FIG. 3) identifies node (c, 7), as expected. Indexes of FIG. 3 are changed to simulate a close-and-open sequence after the reuse graph edition.

In the case a tuple is broken, design is tedious because the designer has to reconnect tuples manually. It is thus an aim of the invention to provide a solution for automatically repairing broken tuples in order to facilitate design.

SUMMARY OF THE INVENTION

This aim is achieved with a computer-implemented method for designing an assembly of a plurality of objects, the assembly being modeled by a directed acyclic modeling graph having nodes and arcs, wherein:
each node represents an object of the assembly, and
each arc represents the use of an end node by an origin node, at least one arc being uniquely identified by an identifier,
the assembly being further modeled by at least one relation having at least one tuple containing a first chain of at least one identifier,
the method comprising the steps of:
determining at least one mapping between the first chain and a second chain of at least one identifier,
substituting at least one occurrence of the first chain in the tuple of the relation with the second chain.
Preferred embodiments comprises one or more of the following features:
the modeling graph is provided by a step of editing an initial modeling graph, the step of determining being carried out according to the step of editing;
the step of editing includes deleting an arc of the initial modeling graph, adding an arc to the initial modeling graph, or rerouting an arc of the initial modeling graph;
prior to the step of editing the initial modeling graph is unfolded, each node of the unfolded initial modeling graph being uniquely identified by a chain of at least one identifier of an arc;
the steps of editing and determining are iterated;
the mapping determined at each iteration of the step of determining increments a mapping list, the mapping list being further compacted;
the method may be performed for designing a first assembly, wherein the mapping is an inverse of a mapping determined in the design of a second assembly, the second assembly being also designed according to the method, the modeling graph of the first assembly and the initial modeling graph of the second assembly being the same;
the method may be performed for designing a first assembly, wherein the mapping is further compounded with an inverse of a mapping determined in the design of a second assembly, the second assembly being also designed according to the method, the initial modeling graph of the first and second assembly being the same;
the method may be performed for designing a first assembly, wherein the modeling graph of the first assembly is provided by the merging of the modeling graph of a second assembly also designed according to the method with the modeling graph of a third assembly also designed according to the method, the initial modeling graph of the second and third assembly being the same, the merging provides that each arc of the modeling graph of the first assembly is an arc of the modeling graph of the second assembly or an arc of the modeling graph of the third assembly, and the step of determining is performed according to the merging;
the method may further comprise the steps of unfolding the modeling graph of the first assembly, the modeling graph of the second assembly, the modeling graph of the third assembly and the initial modeling graph of the second and third assembly, each node of said unfolded graphs being uniquely identified by a chain of at least one identifier of an arc, providing a first corresponding node in the unfolded modeling graph of the second assembly and a second corresponding node in the unfolded modeling graph of the third assembly, said corresponding nodes corresponding to a same corresponded node of the unfolded initial graph of the second and third assembly, and testing if the first corresponding node is in the unfolded modeling graph of the first assembly, wherein if the testing yields a positive result, the determined mappings are from the chain of the corresponded node to the first corresponding node, and from the chain of the second corresponding node to the chain of the first corresponding node;
the method may further comprises the steps of unfolding the modeling graph of the first assembly and the modeling graph of the second assembly, each node of said unfolded graphs being uniquely identified by a chain of at least one identifier of an arc, providing a non-corresponding node in the modeling graph of the second assembly unfolded, said non-corresponding node not corresponding to any node of the initial graph of the second assembly unfolded, and testing if the non-corresponding node is in the unfolded modeling graph of the first assembly, wherein if the testing yields a negative result, the determined mapping is from the chain of the non-corresponding node to the empty chain;

the relation is a mechanical link, a contextual link, a relative positioning, a publication interface, or an organizing tree.

This aim is also achieved with a computer-aided design system comprising:

a database storing objects; and a graphical user interface suitable for designing an assembly of a plurality of objects with the above method.

This aim is also achieved with a computer program comprising instructions for execution by a computer, the instructions comprising means for causing a computer-aided design system comprising a database storing objects to perform the above method.

This aim is also achieved with a computer readable storage medium having recorded thereon the above computer program.

Further features and advantages of the invention will appear from the following description of embodiments of the invention, given as non-limiting examples, with reference to the accompanying drawings listed hereunder.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 32-35 represent examples of the use of the invention when merging graphs.

DETAILED DESCRIPTION OF THE INVENTION

A computer-implemented method according to the invention is intended for designing an assembly of a plurality of objects. The assembly is modeled by a directed acyclic modeling graph having nodes and arcs. Each node represents an object of the assembly. Each arc represents the use of an end node by an origin node. At least one arc is uniquely identified by an identifier. The assembly is further modeled by at least one relation having at least one tuple containing a first chain of at least one identifier. The method comprises the step of determining at least one mapping between the first chain and a second chain of at least one identifier as well as the step of substituting at least one occurrence of the first chain in the tuple of the relation with the second chain. This way, broken tuples are repaired automatically and design is facilitated.

The modeling graph captures the structure of the assembly, or, in other words, the hierarchy between the objects of the assembly. Each object of the assembly is associated to a node of the modeling graph. A pointer to reference data in a database may be attached to a node. This reference data may, for example, comprise specifications of a part, or an assembly of parts.

At least one arc is uniquely identified by an identifier. The identifier is for example a symbol, or a character, or a chain (or string) of symbols or characters. Any type of identifier known from the prior art is suitable to identify the arc. In the following, the symbol "$u_x$", which is the character "u" followed by a numeral index x is used as an example to identify an arc.

More generally, all arcs of the modeling graph are uniquely identified. This is however not a requirement.

Thus, according to some definitions, the graph is said to be "labeled", which means that some information can be attached to arcs and/or nodes.

By definition, "directed" means that all arcs are oriented. The modeling graph is directed, so that each arc, oriented from an origin node to an end node, represents the use of the end node by the origin node. Such oriented arcs represent input arcs from the point of view of end nodes and output arcs from the point of view of origin nodes. A use is defined as in prior art. The graph is directed because there would be no mechanical meaning for an object of the assembly to use another object and be used by the same other object simultaneously.

By definition, "acyclic" means that there is no cycle of arcs. The modeling graph is acyclic otherwise an object would be recursively defined by itself, which is a nonsense from the bill of material point of view.

By definition, "single root" means that only one node (called the root node) has no input arcs. The modeling graph is generally a single root graph. This is notably the case of the example of FIG. 1. Indeed, the designer generally works on one assembly of objects. However this not a limitation as the designer may be working on a set of assemblies of objects.

Figure 6:
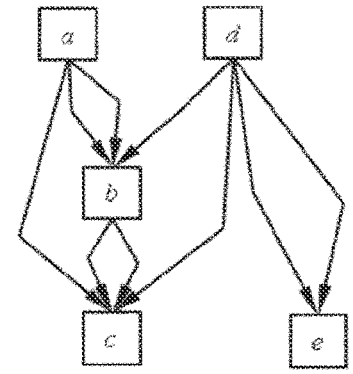
FIG. 6 represents a multi root directed acyclic graph.
Figure 7:
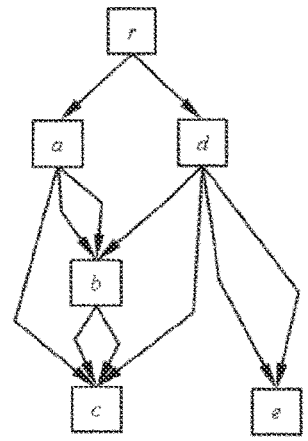
FIG. 7 represents a single root directed acyclic graph obtained from the graph of FIG. 6.

For the sake of concision, the modeling graph will be considered in the following as a single root directed acyclic graph (DAG). However, the example of FIGS. 6 and 7 shows that generalisation to a multi root DAG is straightforward. Indeed, a multi root DAG, such as the one represented in FIG. 6, is easily transformed into a single root DAG by adding a root node r and arcs connecting this root node r to all former root nodes, as illustrated in FIG. 7.

The modeling graph may thus be a reuse graph as known from the prior art. However, the invention is applicable to other types of assemblies modeled by a DAG.

The assembly is further modeled by at least one relation having at least one tuple containing a first chain of at least one identifier.

In set theory, a relation is an unordered set of tuples. A tuple is an ordered set of at least one element. However, the tuple being ordered is not a requirement for the application of the invention. Thus, a tuple will be considered as a set of at least one element in the following. The arity of a tuple is the number of elements it contains. One speaks about the arity of a relation when all the tuples of the relation have the same arity. The arity of the relation is then the arity of its tuples. A relation does not necessarily have an arity, as it may contain tuples of different arities.

In the context of the design of an assembly, the relation modeling the assembly captures design characteristics of the assembly. An example of such a relation, the relation Connect, has already been presented above with reference to FIG. 3. Generally speaking, relations capture one of the following:
- mechanical links between objects such as dimensioning and positioning constraints,
- relative positioning between objects and their parent objects,
- contextual links between objects such as copy-with-link objects with or without relative positioning specification
- interface publications, and
- organizing trees.

Mechanical links and positioning constraints are intuitive in the context of the design of an assembly of a plurality of objects and known from prior art. The relation Connect presented earlier notably belongs to this category. They do not need to be further discussed.

Relative positioning relations are now briefly discussed. When applied to the assembly of objects, in particular to mechanical assemblies of rigid parts, each arc of the modeling graph carries the relative position of the end node with respect to the origin node. By definition, the relative position of axis system $R_1$ with respect to axis system $R_2$ is the isometric 3D transformation P that brings $R_2$ onto $R_1$. For example, in reference to FIG. 1, arc $u_4$ carries the relative position of the (use of) object c in object b. Similarly, arc $u_1$ carries the relative position of the (use of) object b in object a. Unfolding the reuse graph includes on-the-fly positioning computation of each part. For example, in reference to FIG. 2, the position of part (c, 2) is the combination of relative position of c with respect to b and relative position of b with respect to a. It is preferable, for resource saving, to capture a relative position as a relation of arity 1.

Contextual links relations are now briefly discussed. Let S and T be two objects used within an assembly, respectively named the source part and the target part. A contextual link is created by copying a geometry of object S into object T. The copy saves the link between the source geometry and the copied geometry, meaning that if the source geometry is changed, the copied geometry is updated in order to feature the new shape. There are two ways to manage the position of the copied geometry: absolute positioning and relative positioning. Absolute positioning is to place the copied geometry in the referential of object T at its position in object S. Moving objects S and/or T within the assembly has no effect on the position of the copied geometry in the referential of object T. Relative positioning is to place the copied geometry in part T according to the relative position of objects S and T within the mechanical assembly. Moving objects S and/or T within the assembly changes the position of the copied geometry in the referential of object T.

Interface publication relations are now briefly discussed. Many applications need a rigorous definition of object interfaces. The interface of an object is what allows the object to communicate with the outside world. For example, the interface of a wheel may comprise a bore and a tread. For this purpose, definitions of the interface of an object are exposed outside the object, they are published, and external links are supposed to connect published objects only. A publication is described by a user defined name and a path of arcs defining the published object among the modeling graph. Conceptually, a publication behaves like a relation of arity one, i.e. a relation of which tuples contain only one object.

Organizing tree relations are now briefly discussed. In many circumstances the designer's need is to re-organize the parts of the assembly without changing the modeling graph. The parts of the assembly may correspond to the leaf nodes of the unfolded tree. How to obtain the unfolded tree corresponding to the modeling graph has already been discussed and is known from prior art. Organizing tree tuples may be created each time the tree structure provided by the unfolded tree is not convenient. To solve this problem, a new tree structure is created, called the "organizing tree". Nodes of this organizing tree are what the designer requires in terms of type, name etc. The only condition is to associate each leaf node of the organizing tree to a leaf node of the unfolded tree. Leaf nodes of the organizing tree know the leaf nodes of the unfolded tree through their paths of arcs. Of course, as many organizing trees as needed can be created. As a consequence, an organizing tree is a relation for which the arity is as high as the number of leaf nodes of the unfolded tree corresponding to the modeling graph Of course, the assembly is not necessarily modeled by a relation belonging to one of the categories cited above. It may be modeled by any other relation useful to the design of an assembly of objects.

For simplicity, the concepts are mainly illustrated in the following by relations of arity 2, i.e. relations between two objects. However, generalisation to relations of arbitrary arity (for example arity 1, for instance in the case of relative positioning and interface publication, or possibly higher arity, for instance in the case of organising tree), and relations without a fixed arity is straightforward.

The relation captures design characteristics of the assembly through its tuple. In other words, the tuple provides information that the objects (or the object) to which the tuple corresponds are within the relation. In this sense, the tuple further models the assembly. A tuple is typically encoded as a sequence of characters. However, any way of encoding this information is within the scope of the invention. By extension and for the sake of concision, it is referred to both the set of objects within the relation and to the encoding of this information with the same word "tuple".

The relation modeling the assembly has at least one tuple. A valid tuple corresponds to a set of objects of the assembly. On the contrary, a broken tuple fails to identify a set of objects of the assembly within the relation.

A tuple identifies a set of objects of the assembly by referring to the nodes representing the objects. As in prior art, nodes are referred to by using paths of arcs identifying the nodes. Thus, the tuple contains a first chain of at least one identifier. The identifiers in the first chain may comprise identifiers of arcs of the modeling graph. This is however not always the case, for example when a tuple is broken.

The method comprises the step of determining at least one mapping between the first chain and a second chain of at least one identifier as well as the step of substituting at least one occurrence of the first chain in the tuple of the relation with the second chain. In the case the tuple is broken, substituting the first chain with the second chain allows to repair the tuple. The mapping between the first chain and the second chain provides means for correctly performing the step of substituting without the intervention of the designer. Thus, the repair is automatic and the designer does not need to manually reroute the tuples. Consequently design is facilitated.

The relation may have a plurality of tuples containing the first chain. Alternatively or additionally, the assembly may be further modeled by another relation having at least one tuple containing the first chain. The idea is that there may be more than one tuple containing the first chain. This is the case notably when an object of the assembly is within several relations and/or within several tuples of a same relation. In this case, the step of determining is performed only once. The step of substituting may be performed for all the tuples containing the first chain, or all the tuples containing the first chain which have been selected for repair. In the case the tuples containing the first chain are broken, design is considerably facilitated because the designer does not need to manually repair tuples one by one. Indeed, the repair is automatic as all the substitutions are performed automatically on the basis of the mapping.

Performing the step of substituting to any tuple may comprise applying to the tuple the determined mapping from the first chain to the second chain. In the case the tuple does contain the first chain, applying the mapping comprises substituting the first chain with the second chain in the tuple. In the case the tuple does not contain the first chain, applying the mapping is the same as applying the identity mapping, as no substitution occurs. Accordingly, the method may comprise a step of testing whether or not tuples contain a first chain of a mapping and applying the mapping only to tuples which contain the first chain. Alternatively, the method may apply the mapping to all tuples without the step of testing.

The modeling graph may be provided by a step of editing an initial modeling graph. In other words, the initial modeling graph may be changed, or modified. The step of determining may then be carried out according to the step of editing.

Figure 1:
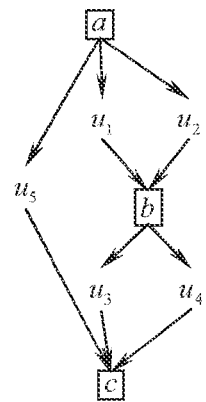
FIG. 1 represents an example of a reuse graph.

As already explained above, FIG. 1-5 illustrate how editing a graph leads to a broken tuple. The graph of FIG. 1 is an initial graph modeling an assembly. A relation Connect with one tuple further model the assembly. As known from the prior art, the tuple is coded using chains of identifiers of arcs of the initial modeling graph. A chain of identifiers correspond to a path of arcs. As shown in the example of FIG. 3, the relation Connect may have a tuple Connect[$u_1u_3,u_2u_3$].

Figure 4:
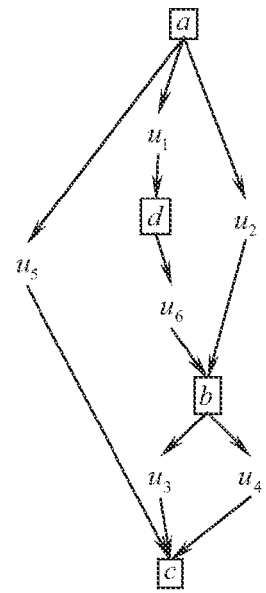
FIG. 4 represents the reuse graph of FIG. 1 after edition.
Figure 5:
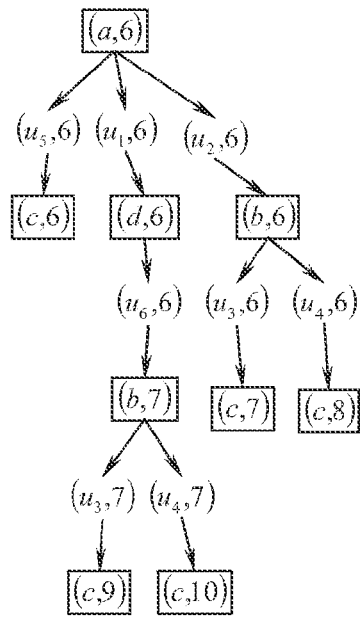
FIG. 5 represents the unfolded edited graph corresponding to the edited reuse graph of FIG. 4.

Editing (or modifying) the initial modeling graph may provide a modeling graph such as the one represented in the example of FIG. 4 after the following sequence of basic operations is performed:
1. create node d,
2. create arc $u_6$,
3. set origin of arc $u_6$ to node d,
4. set end of arc $u_6$ to b and
5. change the end of arc $u_1$ to node d.

Editing the graph may thus include:
deleting an arc of the initial graph,
adding an arc to the initial graph, or
rerouting an arc of the initial graph.

Adding an arc is the same as creating an arc. Rerouting an arc means redefining its origin node and/or its end node.

Other ways of editing the graph, such as duplicating an arc, are within the scope of the invention. The above basic arc operations provide a minimal set of operations upon which other edition operators may be based. Indeed, even nodes may be encoded through a path of arcs. For example, creating a node consists in adding an arc and rerouting other arcs, as shown by the example of FIG. 4.

Prior to the step of editing, the initial modeling graph may be unfolded. Each node of the initial graph unfolded may be uniquely identified by a chain of at least one identifier of an arc. The chain corresponds to a path of arcs of the initial graph. Unfolding the initial modeling graph prior to the step of editing renders the step of editing more user-friendly.

Figure 2:
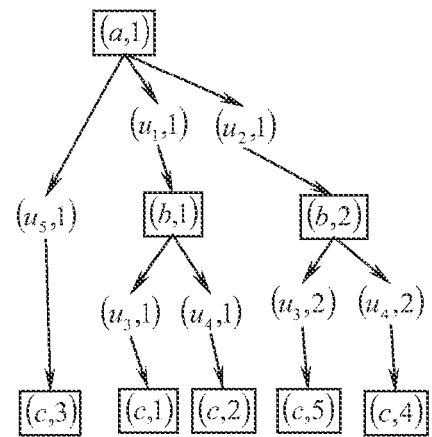
FIG. 2 represents the unfolded graph corresponding to the reuse graph of FIG. 1.
Figure 3:
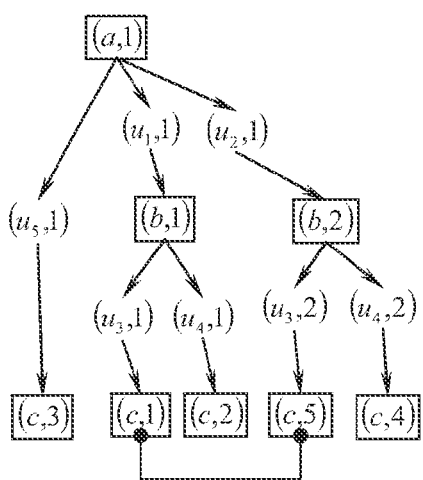
FIG. 3 represents an example of a relation on the reuse graph of FIG. 1.

FIG. 2 is an example of the result of unfolding the initial graph of FIG. 1. FIG. 3 provides an illustration of the tuple Connect[$u_1u_3,u_2u_3$] in the initial modeling graph unfolded of FIG. 2.

The modeling graph is thus the result of the editing of the initial modeling graph. In the context of the modeling graph of FIG. 4, the tuple Connect[$u_1u_3,u_2u_3$] is broken because the path $u_1u_3$ does not identify any node of the unfolded modeling graph represented in FIG. 5.

This example shows how editing a graph breaks tuples. A solution for automatically repairing such broken tuples is to determine the mapping between the first chain and the second chain according to the step of editing. For example, operation 5 that changes the origin of arc to from node a to node b may be associated with the mapping to $u_1 \rightarrow u_1u_6$ between the first chain to and the second chain $u_1u_6$.

Figure 8:
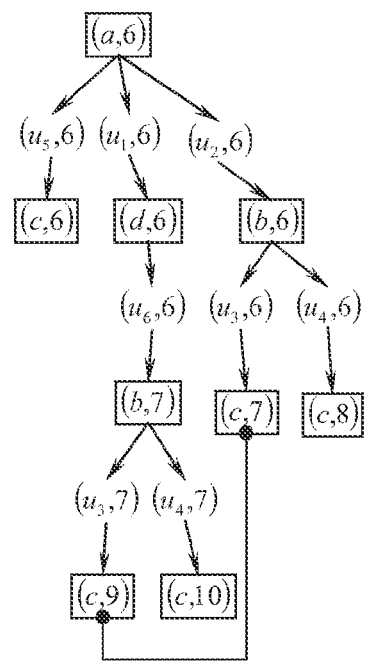
FIG. 8-10 represent other modifications of the graph of FIG. 1.

This means that the step of substituting formally replaces the first chain, symbol to, by the second chain, the string of symbols $u_1u_6$. After computing the unfolded graph, and before searching the nodes to connect, the mapping resulting from the step of editing is formally applied to the tuple Connect[$u_1u_3,u_2u_3$]. In the example, this changes the tuple Connect[$u_1u_3,u_2u_3$], broken in the context of the modeling graph, by the tuple Connect[$u_1u_6u_3,u_2u_3$]. With reference to FIG. 8 which represents an illustration of the tuple, after the step of substituting, on the modeling graph of FIG. 4, this tuple is valid as it correctly identifies two nodes of the unfolded modeling graph through arc paths $u_1u_6u_3$ and $u_2u_3$. As in prior art, this valid tuple can be coded on non-persistent symbols as Connect[(c,9), (c, 7)] each time the modeling graph is unfolded.

An alternative way to "change the structure", without breaking the tuple, lies in modifying the organizing tree. This never breaks links because the modeling graph is unchanged. Conversely, the invention provides a method to automatically repair the tuple despite a reuse graph edition.

Thanks to the automatic repairing of broken tuples after edition of the modeling graph, the PLM/CAD system only requests mandatory repair tuple or reroute tuple operations to the designer. "Obvious" reroute operations are automatically performed by the system. Consequently, the designer is not frustrated by spending time on non productive tasks and saved time is dedicated to design tasks. Furthermore, quality is saved because potential errors caused by manual reroute operations are eliminated.

The steps of editing and determining may be iterated. The initial modeling graph may be edited several times. Each time, a mapping may be determined accordingly.

Suppose for example that, the designer performs an edition by inserting a new reference d between a and b, same as above, and by inserting another new reference e between d and b. The resulting modeling graph and unfolded modeling graphs are respectively shown in FIGS. 9 and 10.

The mappings determined at the step of determining after each editing step, according to each editing step, are: to $u_1 \rightarrow u_1u_6$ and $u_6 \rightarrow u_6u_7$.

Each mapping determined at an iteration of the step of determining may increment a mapping list. Such a mapping list models the assembly. A list is an ordered set. Thus, the mappings of the list are ordered. The incrementing respects the order in which the iterations of the step of determining are carried out. This way, the mapping list keeps track of the editing history. It allows automatically repairing broken tuples even in the case sophisticated editions comprising many steps are performed on the initial modeling graph.

Figure 9:
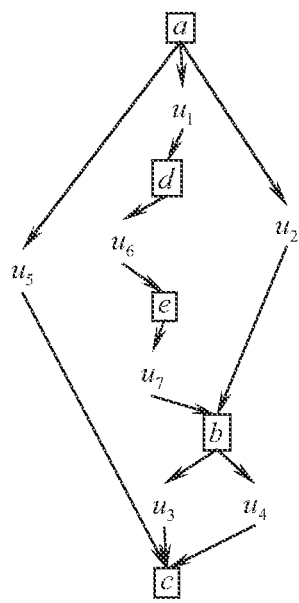
Figure 10:
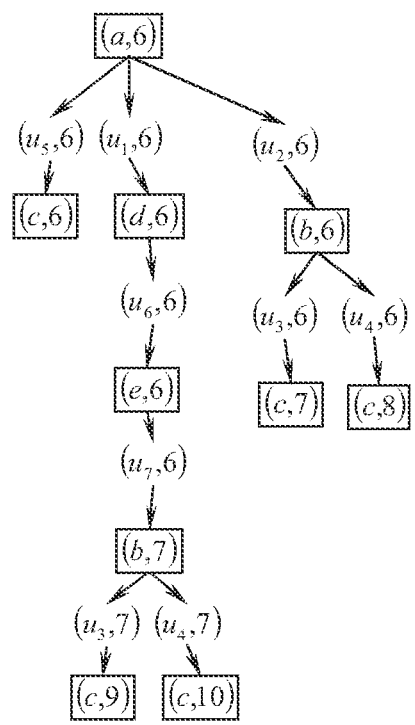

In the above example, the list consists of mappings to $u_1 \rightarrow u_1u_6$ and $u_6 \rightarrow u_6u_7$. Thus, tuple Connect[$u_1u_3,u_2u_3$], which is broken in the context of the edited graph of FIGS. 9 and 10, is repaired by substituting successively the chain $u_1$ by chain $u_1u_6$ and then chain $u_6$ by chain $u_6u_7$ so that it becomes Connect[$u_1u_6u_7u_3,u_2u_3$], which is a valid tuple in the context of the edited modeling graph.

Before the step of substituting, the mapping list may be compacted. Indeed, in the example of FIGS. 9 and 10, one may notice that the list of two mappings $u_1 \rightarrow u_1u_6$ and $u_6 \rightarrow u_6u_7$ can be compacted into only one: to $u_1 \rightarrow u_1u_6u_7$. The broken tuple is then repaired so as to become the same valid tuple Connect[$u_1u_6u_7u_3,u_2u_3$] as before, which correctly connects occurrence nodes (c,9) and (c, 7) of the unfolded graph of FIG. 10. This allows memory resource saving. For processor performance purpose, this compacting operation may be performed before the step of substituting.

More generally, the invention defines a software architecture such that:

Any operator editing the modeling graph determines mappings. The mappings may be determined automatically according to rules. Such rules are the responsibility of the software engineer in charge of the edition algorithm. A mathematical theorem, proven later in the following, may help defining such rules. Mappings may also be determined by the designer.

The mapping list may be compacted before application for performance purpose.

The compacted mapping list may be formally applied for substitution to all tuples involved in all relation definitions. Alternatively, some of the mappings of the mapping list may be applied to some of the tuples.

Figure 11:
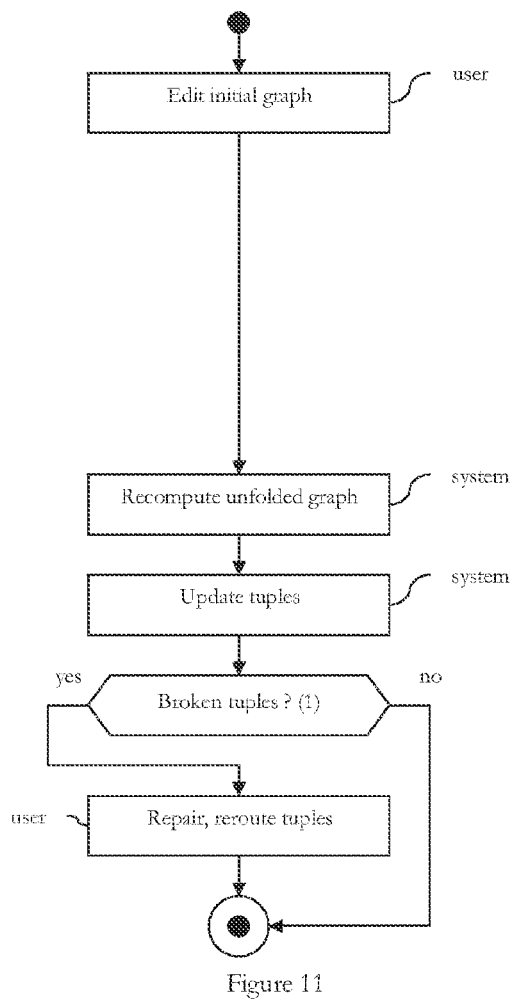
FIG. 11 illustrates a chart of the state of the art process.
Figure 12:
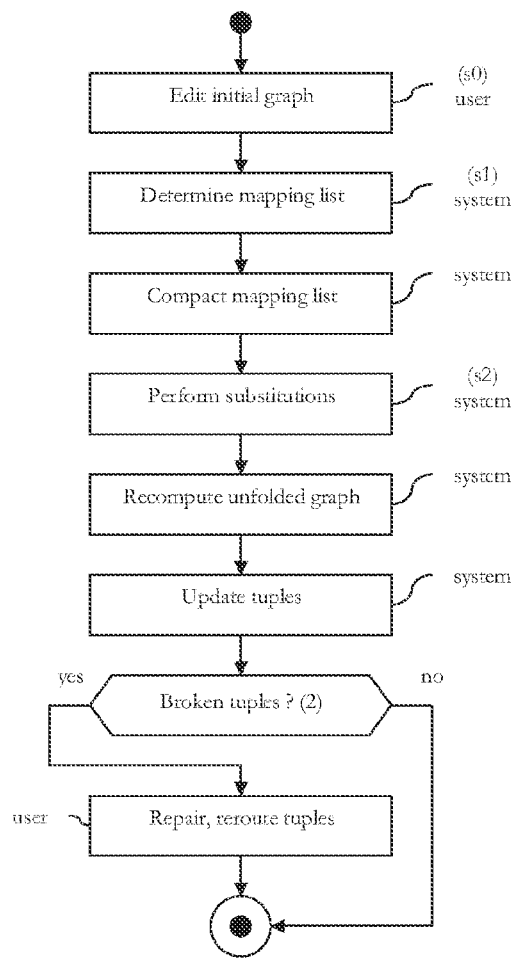
FIG. 12 illustrates a chart of an example of the invention process.

FIG. 11 illustrates a chart of the state of the art process. Tuples are updated after the unfolded modeling graph is recomputed and many broken links (1) must be repaired by the designer. FIG. 12 illustrates a chart of an example of the invention process. Mappings are created during the edition of the modeling graph. They are formally applied to all paths involved in tuples before updating the tuples. Remaining broken tuples (2), if any, are to be repaired or rerouted by the user for genuine design purpose only, which is proven later by a mathematical theorem.

Figure 13:
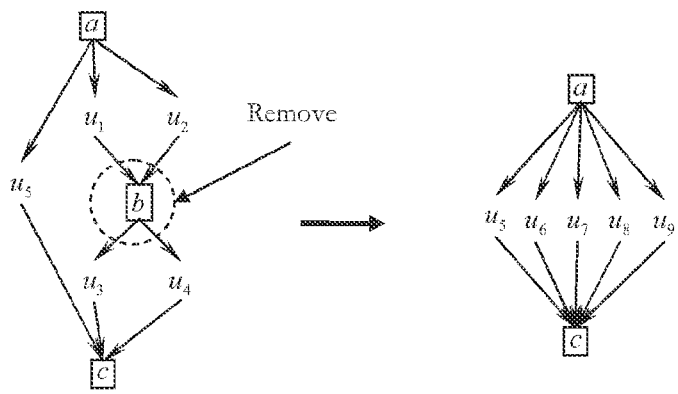
FIG. 13-14 represent an example of an edition operation on the modeling graph of FIG. 1.
Figure 14:
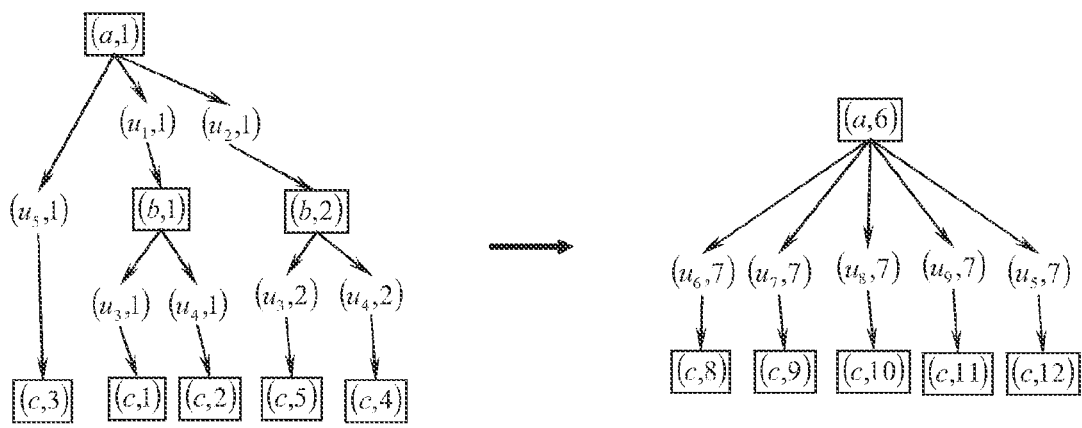

FIG. 13 represents an example of a more sophisticated edition operation on the modeling graph of FIG. 1. The goal is to provide a flat modeling structure by removing the intermediate node. For example, the design may edit the leftmost graph of FIG. 13 into the rightmost graph of FIG. 13 by removing intermediate node b. The goal of this operation is to maintain the same number of parts (corresponding to leaf nodes as already explained) in the unfolded modeling graph. In the example of FIG. 13, there are five uses of part c before the "remove b" operation. The unfolded graph of the edited modeling graph must thus feature five occurrences of part c, as illustrated in FIG. 14.

The "remove" operation provides the following mappings:

$u_1u_3 \rightarrow u_6$ $u_1u_4 \rightarrow u_7$ $u_2u_3 \rightarrow u_8$ $u_2u_4 \rightarrow u_9$ This way, tuples coded on the initial modeling graph are automatically translated into symbols of the edited modeling graph. Unfolding the modified modeling graph and updating tuples provide a correct assembly. The table below illustrates the link's coding depending on the design step (indexes are those of the previous figures).

| | Initial | Edited |
|---|---|---|
| Modeling graph | Connect[$u_1\ u_3, u_2\ u_3$] Publish[$u_2u_4$] | Connect[$u_6, u_8$] Publish[$u_9$] |
| Unfolded modeling graph | Connect[(c, 1), (c, 5)] | Connect[(c, 8), (c, 10)] |

The above explanations highlighted the use of the invention in the context of one designer designing an assembly of objects by editing an initial graph modeling the assembly. The invention is also useful in the context of collaborative design, that is, design which involves more than one designer.

Collaborative design is for several users to get a local copy of the initial object and to modify this local copy. Modification is to change the assembly structure, add and remove relationships.

In the state of the art, collaborative design is tedious for the following reason. Two users get a local copy of an initial graph modeling an assembly. They both independently edit the modeling graph and create relations and tuples within such relations. Sending a tuple from a designer to the other is not compatible with the current technology. As already mentioned above, the tuple points at nodes through paths or arcs of the modeling graph. Consequently a relationship created in the context of a modeling graph A and sent to the context of another modeling graph B is generally unable to reconnect pointed nodes.

The problem of "concurrent design" or "collaborative design", i.e. several designers working on the same assembly and exchanging modifications through the network, has been addressed in the literature. Notably, recent research about text synchronizers led to the "transformational approach" concept. This concept provides very simple generic definitions and properties to design a safe data synchronizer. Source reference is: *Using the transformational approach to build a safe and generic data synchronizer*, P. Molli, G. Oster, H. Skaf-Molli and A. Imine, INRIA Lorraine France, 2003. However this article relates to "text synchronization", which is a field far from concepts related to the assembly of a plurality of objects.

Suppose that two designers are working collaboratively. Formally, a first designer may work on a first assembly and a second designer may work on a second assembly. The collaboration lies in the fact that both designers may start from the same initial modeling graph.

Suppose now that the second designer edits the modeling graph as detailed above. After edition, the second designer may create a relation and a tuple within the relation. He may then send the tuple to the first designer. However, such a tuple might be broken in the context of the modeling graph of the first assembly.

To solve this problem, the inverse of the mapping resulting from the edition may be determined. In the context of the first assembly, the substituting may be carried out according to the determined inverse of the mapping. In other words, the mapping is the inverse of a mapping determined in the design of the second assembly, the second assembly being designed according to a method which comprise a step of editing the initial graph of the second assembly, the modeling graph of the first assembly and the initial graph of the second assembly being the same. This enhances concurrent and collaborative design. Indeed, thanks to the inverse of the mapping, tuples created in the context of a second user are automatically repaired when sent to the context of a first user working on the initial modeling graph.

However, in the general collaboration process, both users edit an initial graph separately. The issue is then for one user to send a tuple to the other user. Before going into the details, a rough general process of collaborative design is described with reference to FIG. 15 through a simple scenario. User A starts by reading initial graph $G_0$ and edits it into first modeling graph $G_1$. Then, user A sends graph $G_1$ to user B, who edits it into second modeling graph $G_2$. In the meantime user A modifies (his/her copy of) graph $G_1$ into graph $G_3$ and creates tuple x on graph $G_3$. Finally, user A sends tuple x to user B. Without the invention, user B has to carry out a manual reroute of tuple x, as illustrated on FIG. 15, because tuple x does not correctly points at nodes of the new context, which is graph $G_2$.

The invention solves this problem by providing a method for designing a first assembly. The first assembly is edited and a first mapping is determined accordingly. The mapping is further compounded to an inverse of a mapping determined during the edition of a second assembly. The initial graph of the first and second assembly are the same. Thanks to such a method, even if both users edit the same initial graph, they can send relations to one another without systematically having to manually reroute the tuples of the relations.

Figure 15:
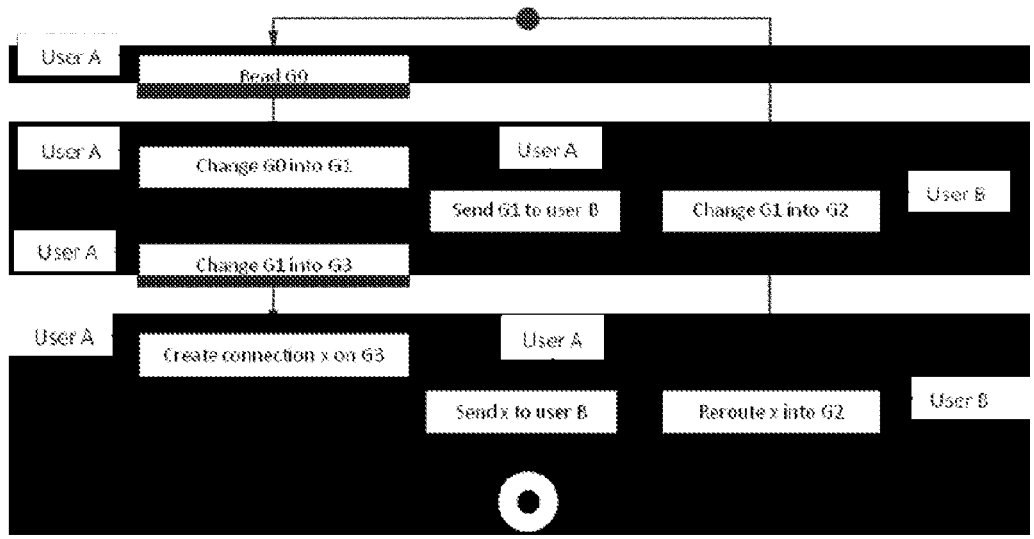
FIG. 15-19 illustrate collaborative design.
Figure 16:
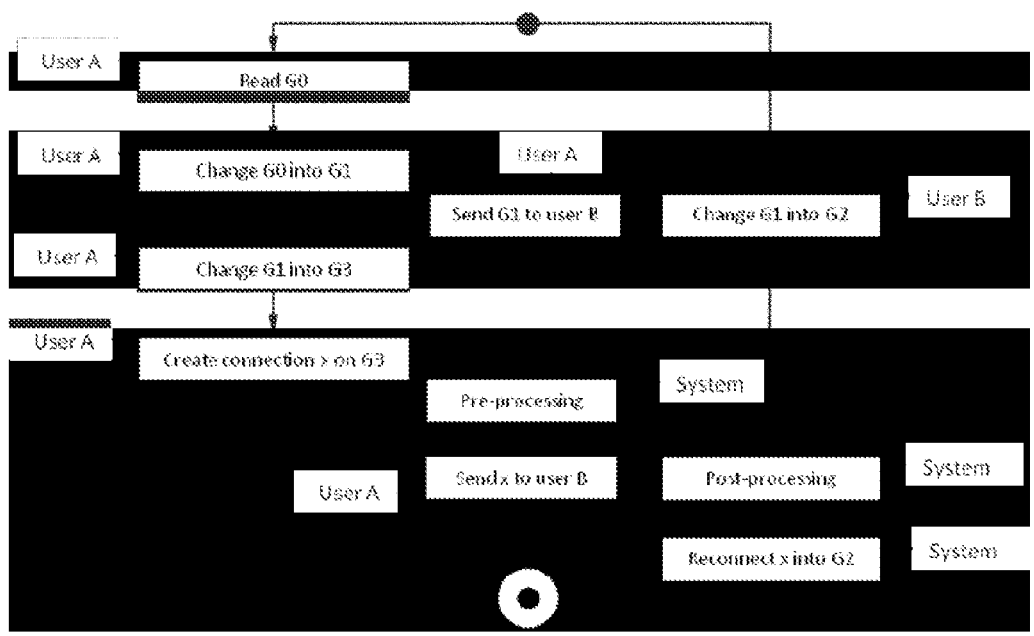

In the example of FIG. 15, in order to successfully and automatically reroute tuple x in graph $G_2$ (remember that tuple x is initially created in $G_3$) the system may perform appropriate pre and post processing steps, as illustrated in FIG. 16.

Figure 17:
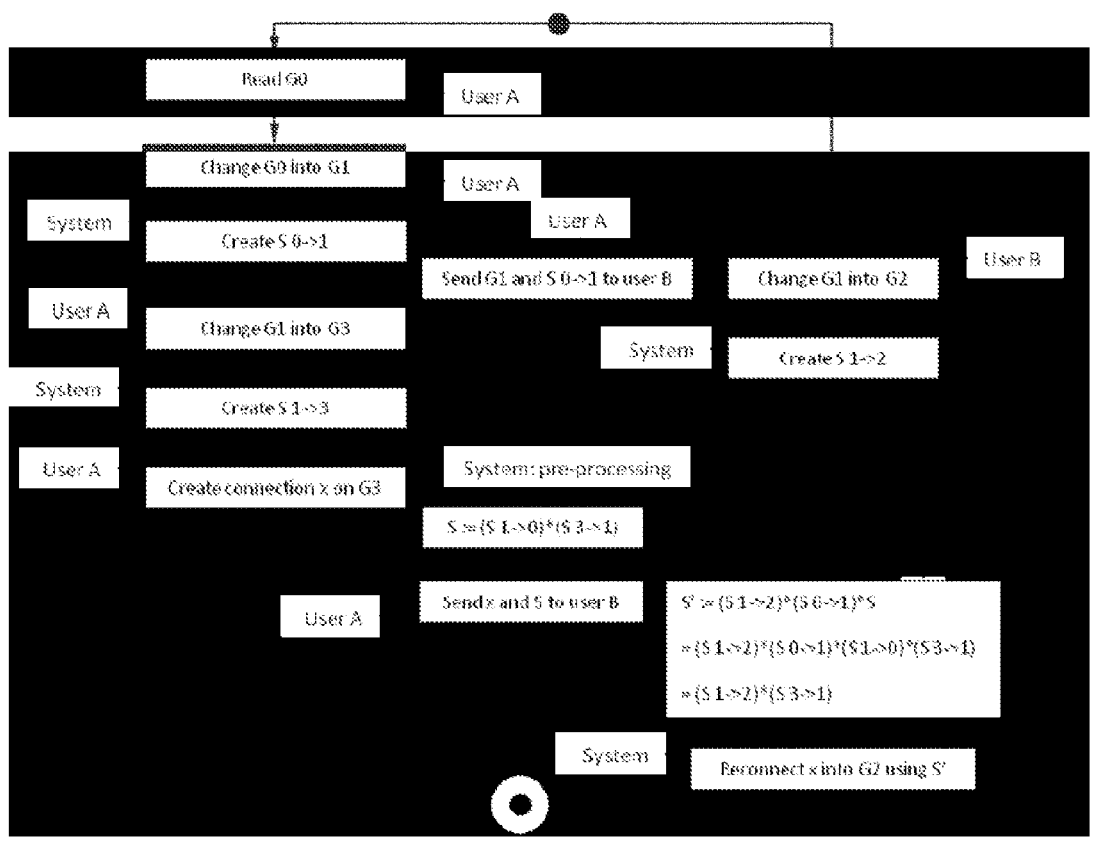

FIG. 17, referring to the same simple scenario of FIGS. 15 and 16, shows the mapping algebra occurring inside the pre and post processing steps. To reach the goal, each time a designer edits the modeling graph, the mappings generated by this edition increment a mapping list, "s-list" for short. Notation $s_{i\_j}$ is the s-list associated with the edition changing graph $G_i$ into graph $G_j$. Inverse mapping $[s_{i\_j}]^{-1}$ is noted $s_{j\_i}$ so that $s_{i\_j} * s_{j\_i}$ is the identity, wherein "*" is the compound operator.

Graph $G_1$ is sent to user B together with s-list $s_{0\_1}$. Preprocessing step is to compute the inverse s-list from graph $G_3$ (where tuple x is created) up to the initial graph $G_0$. Post processing step is to combine this s-list with the one representing changes made by user B on graph $G_1$. This yields the appropriate s-list modeling changes from $G_3$ to $G_2$, which allows rerouting tuple x to its new context: graph $G_2$.

Figure 18:
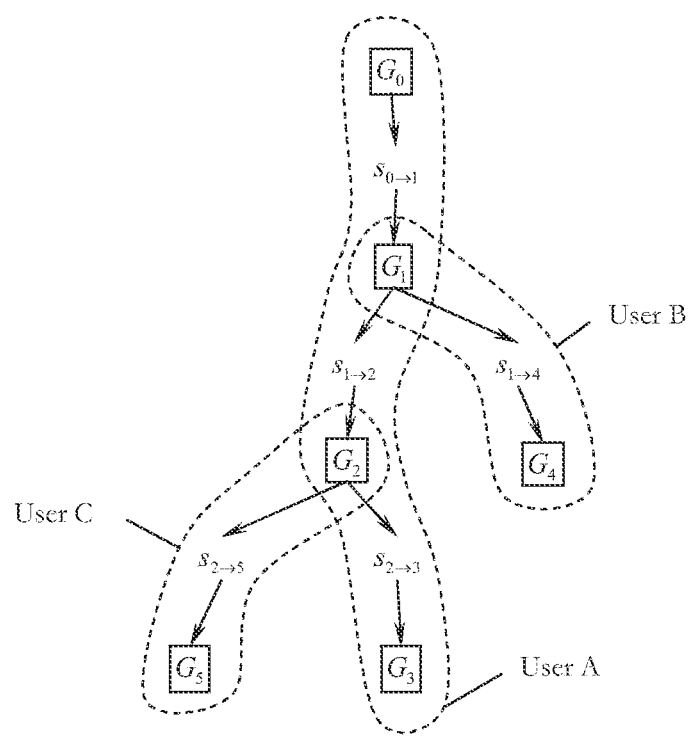

The example of FIG. 18 illustrates a more complicated example involving three users and extensive communication. Suppose that designers A, B and C work on a given assembly. Since they work separately, they use a local copy of the initial modeling graph. They all edit the modeling graph and create relations. The point is to exchange tuples of relations created on different versions of the modeling graph. Conceptually, a dedicated structure may capture all s-lists and their connections to different modeling graph versions. This structure may for example be a directed tree graph. The root node is the initial version of the modeling graph. Other nodes are successive versions of the modeling graph. A directed arc connecting node X to node Y is labelled with the s-list associated with the modifications changing modeling graph X into modeling graph Y. Branches of the tree graph capture modifications made by the same user. For example, initial modeling graph $G_0$ is changed by user A into $G_1$, then $G_2$ and finally $G_3$. User B copies modeling graph $G_1$ and changes it into $G_4$. User C copies $G_2$ and changes it into $G_5$. This yields the tree of FIG. 18.

A tuple of a relation created on any graph can be made compatible with any other graph by applying the suitable sequence of mappings. This sequence is obtained by the unique path in the tree structure connecting the two modeling graphs. For example, a tuple x created by user C on graph $G_5$ is compatible with user's B graph $G_4$ provided the following s-list is applied to the path connected by the tuple: $s_{1\_4}*s_{2\_1}*s_{5\_2}(x)$. Of course, it may happen that some manual reroute is required from the designer, particularly if objects connected by the tuple have been deleted in the new context. This is wanted because it raises a genuine design problem. This way, users can freely and safely exchange tuples.

There is a way to implement this theory with no need of the overall tree structure. The difficult questions of creating, updating and storing this structure are skipped. The principle is illustrated revisiting the previous scenario through a time sequence.

1. User A creates the very first version $G_0$ of the modeling graph.
2. User A edits this modeling graph into a new version $G_1$, and stores the s-list $s_{0\_1}$ associated to this edition.
3. User A sends $G_1$ to user B together with the s-list $s_{0\_1}$.
4. User A edits $G_1$ into another version $G_2$ and stores the s-list $s_{1\_2}$.
5. In the meantime, user B edits $G_1$ graph into another version $G_4$ and stores the s-list $s_{1\_4}$.
6. User A sends graph $G_2$ to user C, together with the compound s-list $s_{1\_2}*s_{0\_1}$.
7. User A edits $G_2$ into $G_3$ and stores the s-list $s_{2\_3}$.
8. User C edits $G_2$ into $G_5$ and stores the s-list $s_{2\_5}$.
9. User C creates tuple x and intends to send it to users A and B.
10. For this purpose, user C sends to user A (a copy of) tuple x together with the compound s-list $S_{1\_0}*s_{2\_1}*s_{5\_2}$
11. User A receives tuple x and compound s-list $s_{1\_0}*s_{2\_1}*s_{5\_2}$.
    a. The first step is to compound this s-list with the s-list of all editions from the initial modeling graph, which yields $(s_{2\_3}*s_{1\_2}*s_{0\_1})*(s_{1\_0}*s_{2\_1}*s_{5\_2})$.
    b. Next step is to simplify $s_{2\_3}*s_{1\_2}*s_{0\_1}*s_{1\_0}*s_{2\_1}*s_{5\_2}$ into $s_{2\_3}*s_{1\_2}*s_{2\_1}*s_{5\_2}$ and into $s_{2\_3}*S_{5\_2}$.
    c. Then user A applies this irreducible s-list to tuple x which makes it compatible with user's A current modeling graph $G_3$, $x:=s_{2\_3}*S_{3\_2}(X)$.
12. User C sends (a copy of) tuple x to user B together with the compound s-list $s_{1\_0}* s_{2\_1}*s_{5\_2}$.
13. User B receives tuple x and s-list $s_{1\_0}*s_{2\_1}*s_{5\_2}$.
    a. The first step is to compound this s-list with the s-list of all editions from the initial graph, which yields $s_{1\_4}*s_{0\_1}*s_{1\_0}*s_{2\_1}*s_{5\_2}$. Remember that $s_{0\_1}$ was sent to user B together with $G_1$.
    b. Next step is to simplify $s_{1\_4}*s_{0\_1}*s_{1\_0}*s_{2\_1}*s_{5\_2}$ into $s_{1\_4}*s_{2\_1}*s_{5\_2}$.
    c. Then user B applies this irreducible s-list to tuple x which makes it compatible with user's B current modeling graph $G_4$, $x:=s_{14}*s_{2\_1}* s_{5\_2}(x)$.

Figure 19:
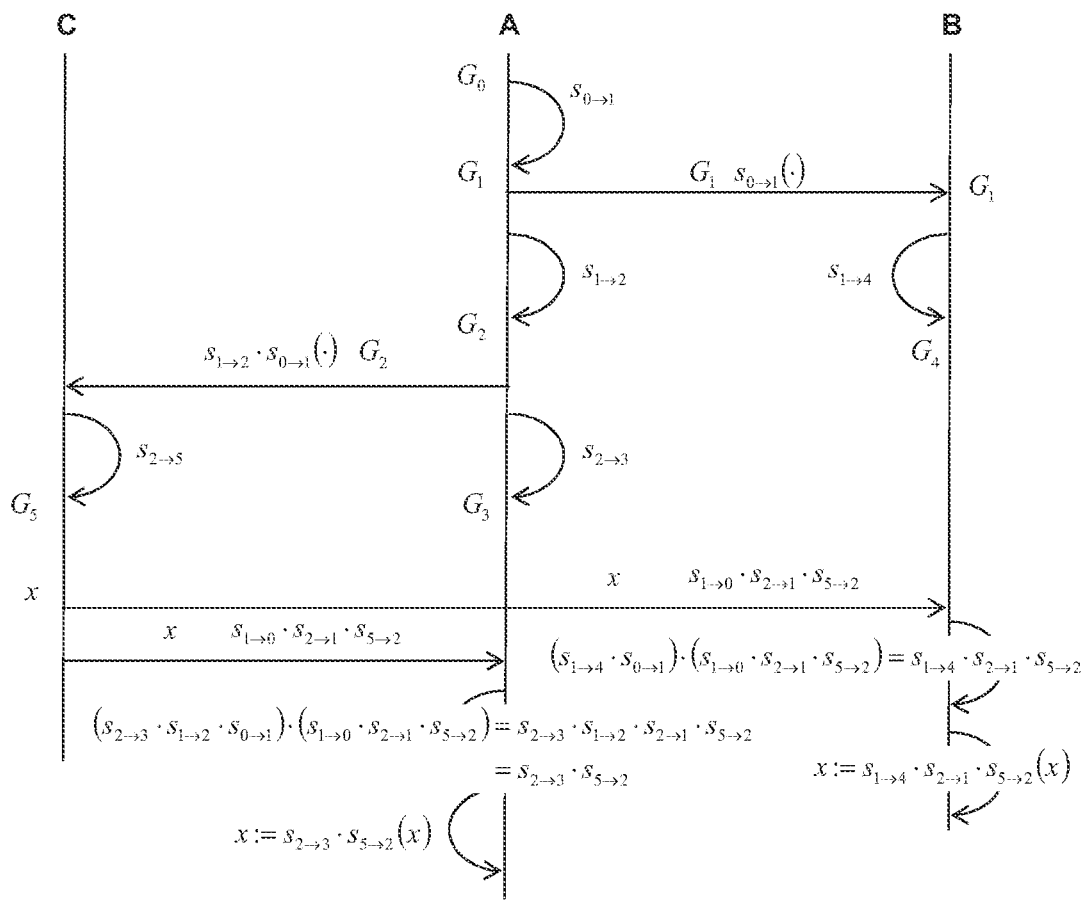

FIG. 19 depicts this time sequence for each of the three users A, B and C and their interactions.

The generic process to exchange a tuple between two users is what follows.

1. Preprocessing: the sender creates the compound s-list of inverse mappings resulting from all editions applied to the initial modeling graph up to sender's modeling graph.
2. The sender mails the tuple and this compound s-list to the receiver.
3. Post processing:
    a. The receiver composes the compound s-list with the compound mappings resulting from all changes applied to the initial modeling graph up to receiver's modeling graph.

b. The receiver simplifies the resulting compound s-list.
c. The receiver applies the irreducible s-list to the transmitted tuple.

It should be noticed that receiver's identity has no influence on sender's preprocessing and that sender's identity has no influence on receiver's post processing. The preprocessing for sending to all designers in one shot is the same. A designer may keep in mail box several relationships sent by other designers and manage all of them in one shot: the post processing is the same. The key point is that the design starts with a common source, which is a standard strategy in parallelism technology.

Notice that the question of conciliating or merging different versions of modeling graph is out of the scope of the invention. Nevertheless, given a tool to solve conflicts between modeling graphs, the invention helps to automatically repair tuples as long as changes made to the modeling graph provide s-lists (i.e mapping lists).

The following is dedicated to the theorem (and its formal proof) that consolidates the foundation of the invention. This theorem is an abstract result rather than an algorithm to provide the mappings. Nevertheless, the proof can be used as a guideline to investigate mappings of a given graph edition operator. It is referred to concepts commonly known from graph theory and basic algebra. The modeling graph is considered to be a connected, single root, directed acyclic graph. As mentioned earlier, generalization to multi root graph is straightforward. By definition, a "leaf node" has no output arc and a "root node" has no input arc. Given a modeling graph, the corresponding unfolded graph is nothing else than its mathematical "universal covering tree". Let us first define the "equivalence" concept of two modeling graphs.

Let $D_1$ and $D_2$ be two modeling graphs and $U(D_1)$, $U(D_2)$ their respective unfolded trees. Let $L(D_1)$ and $L(D_2)$ be the sets of leaf nodes of $U(D_1)$ and $U(D_2)$ respectively. By definition, $D_1$ and $D_2$ are linked by relation $\rho$ if there exists a bijection g from $L(D_1)$ to $L(D_2)$.

Notice that a formally equivalent but less practical definition would be $|L(D_1)|=|L(D_2)|$. In other words, unfolded trees have the same number of leaf nodes.

Relation $\rho$ has the property of being an equivalence relation on the set of all modeling graphs.

The following is a proof of the above property. Any modeling graph is linked to itself by relation $\rho$ because the set of leaf nodes of its unfolded graph is isomorphic to itself through identity. If $D_1 \rho D_2$ then there exists a bijection from g from $L(D_1)$ to $L(D_2)$. So $D_1 \rho D_2$ thanks to the bijection $g^{-1}$ from $L(D_1)$ to $L(D_2)$. Finally, if $D_1 \rho D_2$ and $D_2 \rho D_3$ there exists a bijection g from $L(D_1)$ to $L(D_2)$ and a bijection h from $L(D_2)$ to $L(D_3)$. So the bijection f=hog from $L(D_1)$ to $L(D_3)$ states that $D_1 \rho D_3$. This ends the proof Consequently, two reuse graphs are said to be equivalent if they are linked through relation $\rho$. This equivalence concept is the mathematical translation of the end user perception. There is no visual disparity between two assemblies of parts if their modeling graphs are equivalent: same types and number of parts. So it is reasonable to claim that these assemblies are equivalent and that relations should not be broken by changing a modeling structure into an equivalent one.

Let $D_1$ and $D_2$ be two equivalent modeling graphs, that is $D_1 \rho D_2$. Suppose that some leaf parts of $D_1$ are connected together through tuples coded on paths of $D_1$ arcs. Then, there exists a unique and minimal set of mappings so that all links can be automatically rerouted on leaf parts of $D_2$.

The following provides a proof of the above theorem. The proof requires a precise definition of how to deal with indexes introduced informally for the unfolded graph. Given an abstract set A, the set C(A) of "formal copies" or "copies" of elements of A is the Cartesian product of A and the set N of positive integers $C(A)=A \times N$. The projection map $\pi(\bullet)$ is defined from $A \times N$ to A and yields the first element of the couple. In other words, if $(a,i) \in A \times N$ then $\pi(a,i)=a$. Element a is the source and (a,i) is a formal copy of a. Of course, given a source element (unique in the set A) there exist as many copies as necessary. Nodes and arcs of the unfolded graph are respectively formal copies of nodes and arcs of the modeling graph. An index generator is needed in order to provide on the fly new indexes i such that for each identifier x only one identifier (x,i) exists. This "formal copy" concept is introduced for mathematical purpose. When drawing a graph, it is a mathematical nonsense to repeat node or arc identifiers. Two occurrences of a given symbol represent different objects, so they must be distinguished, which is done through a formal copy. The projection $\pi(\bullet)$ is easily extended to path of arcs of the unfolded graph as follows. If $(u_1,i_1)(u_2,i_2)\ldots(u_n,i_n)$ is a path of unfolded arcs, then its projection is the path of arcs of the modeling graph defined by $\pi[(u_1,i_1)(u_2,i_2)\ldots(u_n,i_n)]=\pi(u_1,i_1)\pi(u_2,i_2)\ldots\pi(u_n, i_n)$ that is $\pi[(u_1,i_1)(u_2,i_2)\ldots(u_n, i_n)]=u_1 u_2 \ldots u_n$.

Let $D_1$ and $D_2$ be two equivalent modeling graphs. There exists a bijection g from $L(D_1)$ to $L(D_2)$. For each $x \in L(D_1)$, let p(x) be the path of arcs of $U(D_1)$ from the root node down to x. This path is unique because the graph $U(D_1)$ is a tree. Let $g(x) \in L(D_2)$ be the image of x through the bijection g. This defines the mapping $\pi(p(x)) \to \pi(p(g(x)))$.

The path p(g(x)) is unique as well because $U(D_2)$ is a tree. Doing so for all elements $x \in L(D_1)$ yields the set of mappings $S=\{\pi(p(x)) \to \pi(p(g(x))); x \in L(D_1)\}$.

This set is finite, $|S| \leq |L(D_1)|$, but generally too large: one mapping for each leaf node of the unfolded graph. Most of the time, chains of identifiers on both sides of the arrow $\ldots \to \ldots$ may share a prefix and/or a post fix sub chain, or may even be identical. Such pre or post fix sub chains can be removed, which makes the mapping simpler and less numerous. Let S be the minimal set of mappings. Applying these mappings to paths embedded in the tuples on leaf parts of $D_1$ yields tuples defined on leaf parts of $D_2$. Clearly, the set S is uniquely derived from input objects: $D_1$, $D_2$ and g. This ends the proof.

Figure 20:
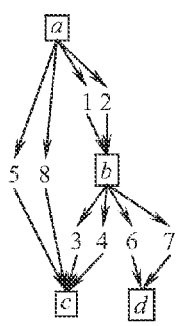
FIG. 20-31 illustrate editions of an assembly.
Figure 21:
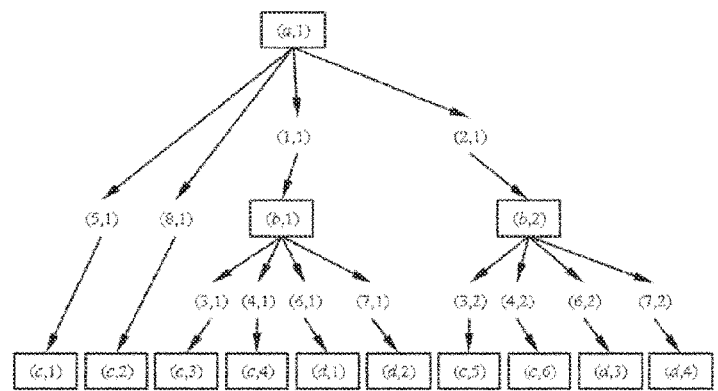

The principle of the proof is illustrated on the example below. For more readable figures, nodes of modeling graph are Latin letters a, b, c, d, ... and arcs of modeling graphs are identified with numbers 1, 2, 3, .... FIGS. 20 and 21 respectively illustrate the modeling and unfolded modeling graphs $D_1$ and $U(D_1)$.

Figure 22:
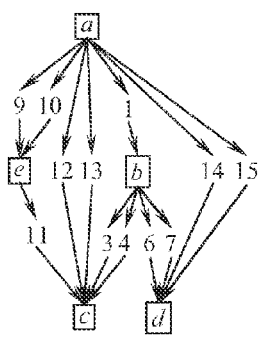
Figure 23:
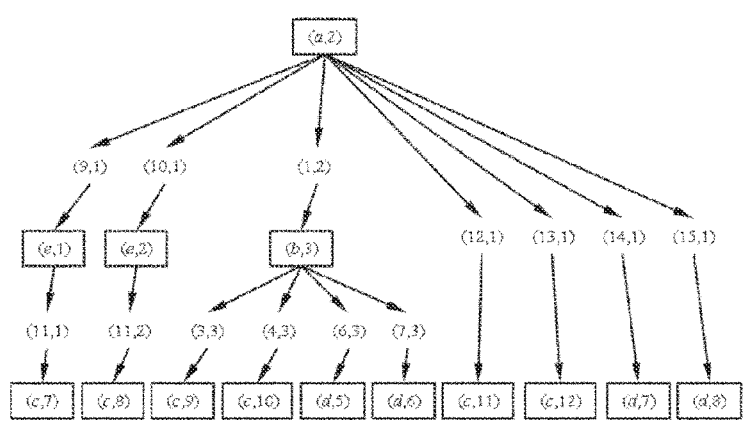

FIGS. 22 and 23 respectively illustrate a modeling graph $D_2$ and associated unfolded graph $U(D_2)$. Notice that despite $D_2$ is a somewhat modified version of $D_1$, they are equivalent, which can only be seen on unfolded graphs. Notice also that sub graph of b is unchanged but reused only once (i.e. only one input arc) in $D_2$.

The bijection g is defined from $$L(D_1)=\{(c,1),(c,2),(c,3),(c,4),(c,5),(c,6),(d,1),(d,2),(d,3),(d,4)\}$$

to $$L(D_2)=\{(c,7),(c,8),(c,9),(c,10),(c,11),(c,12),(d,5),(d,6),(d,7),(d,8)\}$$

by

| | |
|---|---|
| g(c, 1) = (c, 7) | g(d, 1) = (d, 5) |
| g(c, 2) = (c, 8) | g(d, 2) = (d, 6) |
| g(c, 3) = (c, 9) | g(d, 3) = (d, 7) |
| g(c, 4) = (c, 10) | g(d, 4) = (d, 8) |
| g(c, 5) = (c, 11) | |
| g(c, 6) = (c, 12) | |

For simplicity, only the first mapping is detailed. So $\pi(p(x)) \to \pi(p(g(x)))$ yields, with $x=(c,1)$ $\pi(p(c,1)) \to \pi(p(g(c,1)))$
$\pi(p(c1)) \to \pi(p(c, 7))$
$\pi(5,1) \to \pi((9,1)(11,1))$
$5 \to 9/11$ Where "/" is used as a symbol separator. Doing so for remaining leaf nodes of $U(D_2)$: (c,2),(c,3),(c,4),(c,5),(c,6),(d,1),(d,2),(d,3),(d,4) formally yields the following set S of mappings

| | |
|---|---|
| 5 → 9/11 | 2/3 → 12 |
| 8 → 10/11 | 2/4 → 13 |
| 1/3 → 1/3 | 2/6 → 14 |
| 1/4 → 1/4 | 2/7 → 15 |
| 1/6 → 1/6 | |
| 1/7 → 1/7 | |
| that reduces to S⁻ | |
| 5 → 9/11 | 2/4 → 13 |
| 8 → 10/11 | 2/6 → 14 |
| 2/3 → 12 | 2/7 → 15 |

Useless identical chains are due to unchanged sub graph of $D_1$.

Figure 24:
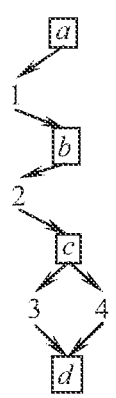
Figure 25:
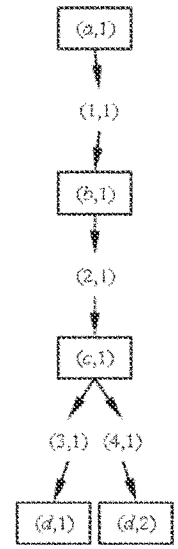
Figure 26:
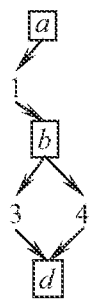
Figure 27:
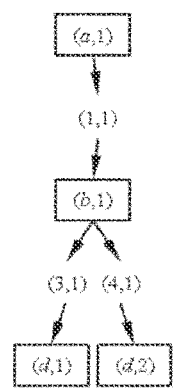

Next example is to illustrate prefix and postfix simplifications. Initial modeling and unfolded graphs are respectively illustrated at FIGS. 24 and 25. Edited modeling and unfolded graphs are respectively as in FIGS. 26 and 27.

Evident bijection induces the set of mappings

1/2/3→1/3
1/2/4→1/4

Eliminating the shared prefix 1 on both mappings yields

2/3→3
2/4→4

Eliminating the shared post fix 3 on first mapping and 4 on the second one yields only one mapping

2→ε where ε is the empty chain. Mapping a chain to the empty chain removes it from a tuple. This means that symbol 2 is removed from all paths of arcs of the tuples of the modeling graph. The connection Connect(1/2/3,1/2/4) coded on the graph of FIGS. 1-3 becomes Connect(1/3,1/4) on the second modeling graph.

The equivalence definition between two modeling graphs involves a bijection g between leaf nodes of unfolded trees. The consequence of this key feature is the formal construction of mappings. Nevertheless, something can be done when reuse graphs are not equivalent, that is when g exists but is not a bijection. Mapping rules are still defined by $\pi(p(x)) \to \pi(p(g(x)))$. The difference is that $g(x)$ may not be defined for all $x \in L(D_1)$, and that $g(x)$ may be equal to $g(y)$ for distinct x and y in $L(D_1)$. This leads to a restricted set of mappings $\pi(p(x)) \to \pi(p(g(x)))$ for all $x \in L(D_1)$ for which $g(x)$ is defined. Same simplifications hold: remove shared prefix and postfix chains. Remaining mapping, if any, are used to reroute or partially reroute connections. Unsolved connections require a user's decision, which is unavoidable to capture the design intent.

Figure 28:
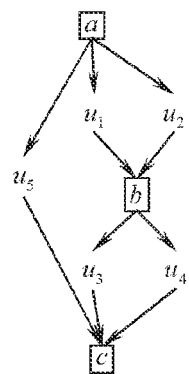
Figure 29:
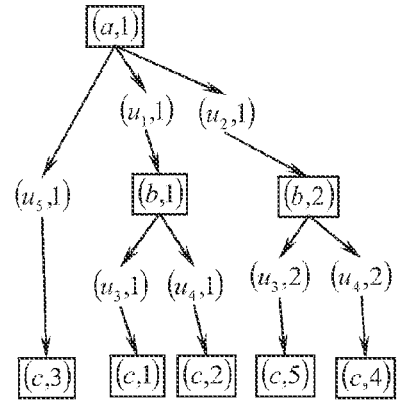

The example of FIGS. 28 and 29 illustrates this scenario. Initial modeling and unfolded graphs are respectively depicted in FIGS. 28 and 29.

Figure 30:
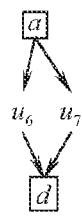
Figure 31:
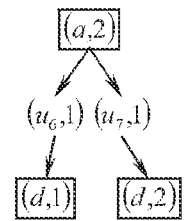

Final modeling and unfolded graphs are respectively as represented on FIGS. 30 and 31. Reference sub assembly b is replaced by a single part d. Reference part c is removed. So connections joining parts of sub assembly b should be rerouted on occurrences of d.

Function g is defined by $$g(c,1)=g(c,2)=(d,1)$$

$$g(c,4)=g(c,5)=(d,2)$$

which induces the mappings $u_1 u_3 \to u_6$
$u_1 u_4 \to u_6$
$u_2 u_3 \to u_7$
$u_2 u_4 \to u_7$.

The theorem proof can be used as a guideline to set up mapping rules of an edition operator. The investigation process, used by the algorithm designer, is what follows.

1. Create a modeling graph $D_1$ on which the edition operator can be applied.
2. Apply formally the edition operator on this modeling graph, which yields a new modeling graph $D_2$.
3. Unfold these two modeling graphs and set the bijection g.
4. Following the proof obtain mapping rules from these objects.

Spatial positioning can be managed through the same strategy. The relative position of reused part or object with respect to its parent object is captured as a tuple connected only one object defined by a length-1 path. Absolute positions (that is relative positions with respect to the root product) are obtained by combining relative positions defined by root-to-leaf paths of arcs. Given two equivalent modeling graphs, the resulting mapping rules provide interesting information about relative positioning. Given an arc $u_i$ of the modeling graph, the associated relative position is noted $P(u_i)$. Given two consecutive arcs of the modeling graph $u_i u_j$ the combination of their respective relative positions is noted $P(u_i) \cdot P(u_j)$. Following this syntax, mapping rules provide equalities that must be satisfied. Given a mapping rule $$u_1 u_2 \ldots u_n \to v_1 v_2 \ldots v_m$$

the corresponding positioning equality is $$P(u_1) \cdot P(u_2) \cdot \ldots \cdot P(u_n) = P(v_1) \cdot P(v_2) \cdot \ldots \cdot P(v_m).$$

In the context of collaborative design, another typical problem is to merge two concurrently modified modeling graphs. How to merge modeling graphs is out of the scope of the invention. The purpose here is to merge the mappings associated with the modeling graph modifications, whatever the result of the merge of the graphs. One could argue that tuples are traditionally captured through arcs in a graph and that tuples within an assembly (modeled by a modeling graph) should be managed, at first glance, by the "graph merging" process. The point here is that tuples managed within a modeling graph are coded on paths or arcs of the modeling graph, through strings of identifiers, which does not fit the "arcs of a graph" format known from the prior art and used in the graph merging process. Thus, in prior art, when merging a graph, relations and their tuples are generally lost. This is why a dedicated treatment is necessary.

Let us consider the modeling graph of a first assembly provided by the merging of the modeling graph of a second assembly with the modeling graph of a third assembly. The second and third assembly are designed after editing a same initial modeling graph. Upon the merging, each arc of the modeling graph of the first assembly is an arc of the modeling graph of the second assembly or an arc of the modeling graph of the third assembly. The step of determining the at least one mapping for the first assembly is performed according to the merging. This provides a tool for automatically adapting tuples when merging two assemblies whatever the result of the merge.

More precisely, let us consider an example given an initial modeling graph A, two modified versions of this initial modeling graph B and B', modeling the second and the third assembly, and a merged modeling graph $\tilde{B}$ modeling the first assembly, the goal of this section is to provide an algorithm to combine mappings associated with concurrent changes A→B and A→B' in order to determine mappings from the initial graph to the merged graph A→$\tilde{B}$, and from each modified graph to the merged graph B→$\tilde{B}$ and B'→$\tilde{B}$. This way, tuples can be updated in any circumstances. This example situation is illustrated by FIG. 32.

The method may comprise the steps of unfolding the modeling graph of the first assembly, the modeling graph of the second assembly, the modeling graph of the third assembly and the initial modeling graph of the second and third assembly. Each node of said unfolded graphs is then uniquely identified by a chain of at least one identifier of an arc.

Figure 32:
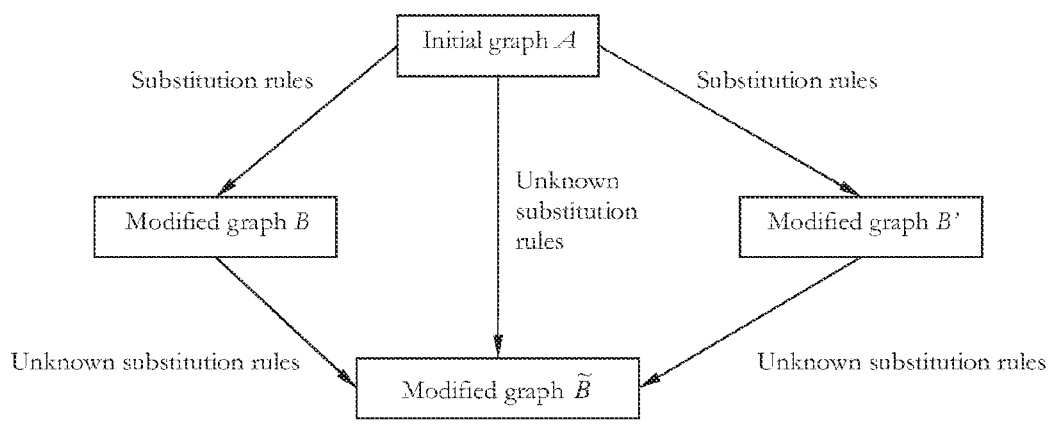
Figure 33:
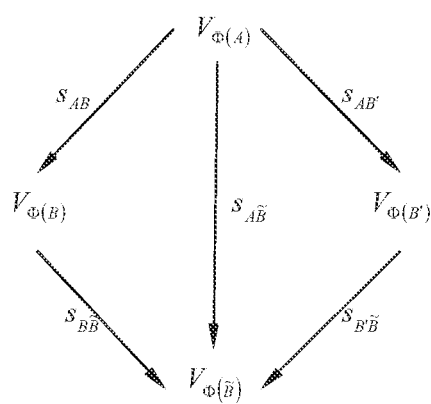

Referring to the example of FIG. 32, let us thus note $\Phi(A)$, $\Phi(B)$, $\Phi(B')$ and $\Phi(\tilde{B})$ the unfolded graphs respectively obtained from modeling graphs and $V_{\Phi(A)}$, $V_{\Phi(B)}$, $V_{\Phi(B')}$, $V_{\Phi(\tilde{B})}$ the sets of nodes of these unfolded graphs. Each node of the unfolded graph $\Phi(X)$ of a modeling graph X is uniquely identified by a path of arcs in graph X. So, there is no ambiguity to identify a node of $\Phi(X)$ and its associated path of arcs of X. Let us note $s_{XY}$, the mappings associated with the edition of modeling graph X into modeling graph Y. It is interpreted as a mapping from unfolded graphs nodes: $s_{XY}: V_{\Phi(X)} \to V_{\Phi(Y)}$. All the objects of this example are linked together according to the diagram of FIG. 33.

The method may comprise a step of providing a first corresponding node in the unfolded modeling graph of the second assembly and a second corresponding node in the unfolded modeling graph of the third assembly, said corresponding nodes corresponding to a same corresponded node of the unfolded initial graph of the second and third assembly. The corresponding nodes are the result of the corresponded node after the editions which results in the second and third assemblies. The method may further comprise the step of testing if the first corresponding node is in the unfolded modeling graph of the first assembly. In other words, the method tests if the transformation in the second assembly of the corresponded node (i.e. the first corresponding node) is kept in the merged assembly (i.e. the first assembly). If the testing yields a positive result, the determined mappings are from the chain of the corresponded node to the first corresponding node, and from the chain of the second corresponding node to the chain of the first corresponding node.

In the case of a negative result, a similar test may be performed for the second corresponding node. If this second test yields a positive result, the determined mappings are from the chain of the corresponded node to the second corresponding node, and from the chain of the first corresponding node to the chain of the second corresponding node. If the test is once again negative, then the determined mapping may be from the chain of the first corresponding node to the empty chain, and from the chain of the second corresponding node to the empty chain.

This corresponds to a first step of the method, which provides mappings for repairing tuples pointing at objects of the merged graph which correspond to the objects of the initial modeling graph.

In a second step, the method may comprise the step of unfolding the modeling graph of the first assembly and the modeling graph of the second assembly. Each node of said unfolded graphs is uniquely identified by a chain of at least one identifier of an arc. The method may further comprise a step of providing a non-corresponding node in the modeling graph of the second assembly unfolded. The said non-corresponding node does not correspond to any node of the initial graph of the second assembly unfolded. In other word, a non-corresponding node is a node created after edition of the initial modeling graph. The method may further test if the non-corresponding node is in the unfolded modeling graph of the first assembly. In other words, it is tested if the created node is kept in the merged graph. If the testing yields a negative result, the determined mapping is from the chain of the non-corresponding node to the empty chain. If the testing yields a positive result, then, no mapping is required, so nothing is done. The same may be performed for non-corresponding nodes in the modeling graph of the third assembly unfolded This corresponds to a second step of the algorithm, which provides mappings for repairing tuples pointing at objects of the merged graph which correspond to the objects created after edition of initial modeling graph.

To illustrate the method, mappings $s_{AB}$ and $s_{AB'}$ are given. Mappings $s_{B\tilde{B}}$ and $s_{B'\tilde{B}}$ are unknown, and the goal is to build them in such a way that the previous diagram is commutative, meaning by definition that $s_{B\tilde{B}} \circ s_{AB} = s_{B'\tilde{B}} \circ s_{AB'}$. The algorithm represented in FIGS. 34 and 35 builds $S_{B\tilde{B}}$, $s_{B'\tilde{B}}$ and $s_{A\tilde{B}}$ through two steps. Notations is the empty chain, the path of arcs with no arc. It is used to map erased path of arcs.

The first step is illustrated by the pseudo-code of FIG. 34. For each node a of the initial modeling graph $\Phi(A)$, the algorithm gets corresponding nodes b and b' in edited graphs: b:=$s_{AB}$(a) and b':=$s_{AB'}$(a). The first case is b still exists in the merged graph while b' does not exist in the merged graph. Consequently, $s_{B\tilde{B}}$(b):=b and, through commutation principle, $s_{B'\tilde{B}}$(b'):=b and $s_{A\tilde{B}}$(a):=b. The second case is the reverse: b' still exists in the merged graph while b does not exist in the merged graph, so $s_{B'\tilde{B}}$(b'):=b', $s_{B\tilde{B}}$(b):=b' and $s_{A\tilde{B}}$(a):=b'. Third case is b and b' both exist in the merged graph. Since b and b' are transformations of the same initial node a and since a new object in one modified graph cannot be equal to a new object in the other modified graph (because concurrent modifications are independent) b and b' are equal to a, so $s_{B'\tilde{B}}$(b'):=a, $s_{B\tilde{B}}$(b):=a and $s_{A\tilde{B}}$(a):=a. Otherwise, there is an ambiguity in the merging process that the algorithm cannot solve. Finally, if b and b' are not in the merged graph (they are both removed by the merging process) then, $s_{B'\tilde{B}}$(b'):=ϵ, $s_{B'\tilde{B}}$(b):=ϵ and $s_{A\tilde{B}}$(a):=ϵ.

The step illustrated by FIG. 34 did not manage nodes created in the modified graph $\Phi(B)$, thus belonging to $V_{\Phi(B)} - s_{AB}(V_{\Phi(A)})$, and nodes created in the modified graph $\Phi(B')$, thus belonging to $V_{\Phi(B')} - s_{AB'}(V_{\Phi(A)})$. So, $s_{B\tilde{B}}$ is completed as illustrated by the pseudo-code of FIG. 35 and as the following explanations. If b is in the merged graph, that is b∈$V_{\Phi(\tilde{B})}$, it was added in $\Phi(B)$ and still is in $\Phi(\tilde{B})$, so $s_{B\tilde{B}}$(b):=b. Conversely, if b is not in the merged graph, that is b∉$V_{\Phi(\tilde{B})}$, it was added in $\Phi(B)$ and removed from the merged graph $\Phi(\tilde{B})$ by the merging process (which is questionable, but details of the merging process are out of the scope of the invention) so $s_{B\tilde{B}}$(b):=ϵ.

Previous algorithm and remarks are symmetrical to complete $s_{B'\tilde{B}}$.

Figure 36:
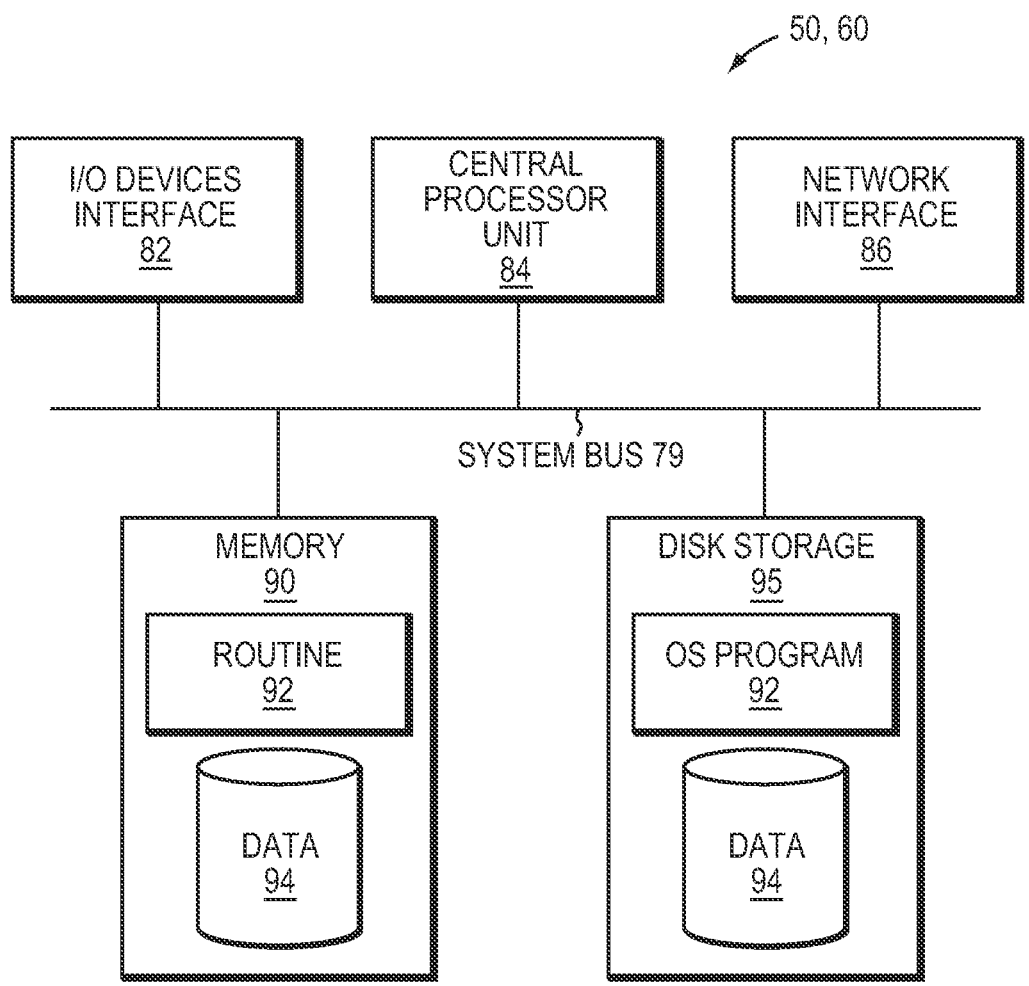
FIG. 36 is a block diagram of a computer system in which embodiments of the present invention are implemented

A computer-aided design system 60 may comprise a database 94 storing objects (FIG. 36). The system may be a PLM/CAD (Object LifeCycle Management/Computer Aided Design) system. The database 94 may store specifications of parts, assemblies of parts, etc. The system 60 may also comprise a graphical user interface (supported by I/O device interface 82) suitable for designing an assembly of a plurality of objects with the method described above. The graphical user interface 82 is interactive, so that a designer may graphically design an assembly and cause the system 60 to perform the method described above as a back process.

A computer program 92 comprising instructions for execution by a computer 50,84, the instructions comprising means for causing a computer-aided design system comprising a database 94 storing objects to perform the method described above, may be provided and for instance installed on a computer 50. Such a program may be recorded on a computer readable storage medium 95, as commonly known.

Generally, a processor 84 will receive instructions 92 and data 94 from a read-only memory 95 and/or a random access memory 90 using system bus 79, network interfaces 86 and/or other program (including hardware and/or software) supporting interfaces 82. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially designed ASICs (application-specific integrated circuits).

The invention is not limited to the provided examples and encompasses modifications obvious to the one skilled in the art.

Notably, the invention was mainly described in reference to the field of mechanical assembly, but it is applicable to any field where reference objects are reused and linked together in a hierarchical structure and where this structure is modified in a collaborative environment. For example, the invention is applicable to the field of video games.

Furthermore, the hierarchical structure was captured through a graph structure in the description. However, the invention is applicable to other structures adapted to capture a hierarchical structure between objects. Notably, it is obvious that prefix encoding, which is equivalent to a graph, is within the scope of the invention as mappings may be applied to a prefix encoding.

The invention claimed is:

1. A computer-implemented method for designing a mechanical assembly of a plurality of physical objects, the method comprising:
by one or more processors:
providing a directed acyclic modeling graph having nodes and arcs, the directed acyclic model graph capturing design characteristics of a mechanical assembly, the mechanical assembly being formed of a plurality of physical objects, the directed acyclic modeling graph representing a hierarchy between physical objects of the mechanical assembly, each physical object being a part of a set of parts of the mechanical assembly, the directed acyclic modeling graph serving as a model representation of mechanical links and relative positionings of different parts of the mechanical assembly;
for each node, using the node to represent a respective physical object of the mechanical assembly;
for each arc, using the arc to represent a use of a use of a physical object by another physical object in the mechanical assembly, for a given arc, the given arc representing a respective physical object represented by an origin node using a respective physical object represented by an end node, wherein a chain of identifiers corresponds to a path of arcs, at least one arc being uniquely identified by an identifier;
further modeling the mechanical assembly using tuples in the graph, by representing at least one design relation of the physical objects using a tuple containing a first chain of identifiers corresponding to a path of arcs between nodes representing a first physical object and a second physical object, said tuple representing a use sequence of the physical objects where the first physical object uses the second physical object in the mechanical assembly;
determining at least one mapping between the first chain and a second chain of identifiers, the second chain having an identifier in common with the first chain; and
substituting at least one occurrence of the first chain with the second chain in the tuple used by the at least one design relation, said determining and substituting automatically reflecting an update of the design characteristics of the mechanical assembly.

2. The method according to claim 1 wherein the modeling graph is provided by a step of editing an initial modeling graph, the step of determining at least one mapping being carried out according to the step of editing an initial modeling graph.

3. The method according to claim 2, wherein the step of editing an initial modeling graph includes:
deleting an arc of the initial modeling graph,
adding an arc to the initial modeling graph, or
rerouting an arc of the initial modeling graph.

4. The method according to claim 3, wherein prior to the step of editing an initial modeling graph, the initial modeling graph is unfolded, each node of the unfolded initial modeling graph being uniquely identified by a chain of at least one identifier of an arc.

5. The method according to claim 2, wherein the steps of editing an initial modeling graph and determining at least one mapping are iterated.

6. The method according to claim 5, wherein the mapping determined at each iteration of the step of determining at least one mapping increments a mapping list, the mapping list being further compacted.

7. The method according to claim 1 for designing a first mechanical assembly and a second mechanical assembly, wherein for the first mechanical assembly the mapping is an inverse of a mapping determined in the design of the second mechanical assembly; and
for the second mechanical assembly the modeling graph being provided by an editing of an initial modeling graph and the step of determining at least one mapping being carried out in the editing of the initial modeling graph, wherein the modeling graph of the first mechanical assembly and the initial modeling graph of the second mechanical assembly are the same.

8. The method according to claim 2 for designing a first mechanical assembly, wherein the mapping is further compounded with an inverse of a mapping determined in the design of a second mechanical assembly, the second mechanical assembly being designed according to the method of claim 2, the initial modeling graph of the first and second mechanical assembly being the same.

9. The method according to claim 2 for designing a first mechanical assembly, wherein:
a modeling graph of the first mechanical assembly is provided by a merging of a modeling graph of a second mechanical assembly designed according to the method of claim 2 with a modeling graph of a third mechanical assembly designed according to the method of claim 2, an initial modeling graph of the second and third mechanical assembly being the same;

the merging provides that each arc of the modeling graph of the first mechanical assembly is an arc of the modeling graph of the second mechanical assembly or an arc of the modeling graph of the third mechanical assembly; and
determining at least one mapping is performed according to the merging.

10. The method according to claim 9 further comprising the steps of:
unfolding the modeling graph of the first mechanical assembly, the modeling graph of the second mechanical assembly, the modeling graph of the third mechanical assembly and the initial modeling graph of the second and third mechanical assembly, each node of said unfolded graphs being uniquely identified by a chain of at least one identifier of an arc;
providing a first corresponding node in the unfolded modeling graph of the second mechanical assembly and a second corresponding node in the unfolded modeling graph of the third mechanical assembly, said corresponding nodes corresponding to a same corresponded node of the unfolded initial graph of the second and third mechanical assembly;
testing if the first corresponding node is in the unfolded modeling graph of the first mechanical assembly;
wherein if the testing yields a positive result, the determined mappings are:
from the chain of the corresponded node to the first corresponding node, and
from the chain of the second corresponding node to the chain of the first corresponding node.

11. The method according to claim 9 further comprising the steps of:
unfolding the modeling graph of the first mechanical assembly and the modeling graph of the second mechanical assembly, each node of said unfolded graphs being uniquely identified by a chain of at least one identifier of an arc;
providing a non-corresponding node in the modeling graph of the second mechanical assembly unfolded, said non-corresponding node not corresponding to any node in the initial graph of the second mechanical assembly unfolded;
testing if the non-corresponding node is in the unfolded modeling graph of the first mechanical assembly,
wherein if the testing yields a negative result, the determined mapping is:
from the chain of the non-corresponding node to the empty chain.

12. The method according to claim 1, wherein the at least one design relation is:
a mechanical link,
a contextual link,
a relative positioning,
a publication interface, or
an organizing tree.

13. A computer-aided design system comprising:
a database storing objects;
a processor communicatively coupled to the database; and
a graphical user interface executed by the processor for designing a mechanical assembly of a plurality of physical objects wherein the mechanical assembly is modeled by a directed acyclic modeling graph having nodes and arcs, the directed acyclic modeling graph capturing design characteristics of the mechanical assembly, the mechanical assembly formed of a plurality of physical objects, the directed acyclic modeling graph representing a hierarchy between physical objects of the mechanical assembly, each physical object being a part or a set of parts of the mechanical assembly, the directed acyclic modeling graph serving as a model representation of mechanical links and relative positionings of different parts of the mechanical assembly; and:
each node represents a respective physical object of the mechanical assembly;
each arc represents a use of a physical object by another physical object in the mechanical assembly, for a given arc, the given arc representing a respective physical object represented by an origin node using a respective physical object represented by an end node, wherein a chain of identifiers corresponds to a path of arcs, at least one arc being uniquely identified by an identifier;
the mechanical assembly being further modeled using tuples in the graph, by representing at least one design relation of the physical objects using a tuple containing a first chain of identifiers corresponding to a path of arcs between nodes representing a first physical object and a second physical object, said tuple representing a use sequence of the physical objects where the first physical object uses the second physical object in the mechanical assembly;
where the processor executing the graphical user interface and designing the assembly includes:
determining at least one mapping between the first chain and a second chain of identifiers, the second chain having an identifier in common with the first chain; and
substituting at least one occurrence of the first chain with the second chain in the tuple used by the at least one design relation, said determining and substituting automatically reflecting an update of the design characteristics of the mechanical assembly.

14. A non-transitory computer readable storage medium having recorded thereon a computer program comprising instructions for execution by a computer, the instructions when executed causing a computer-aided design system comprising a database storing objects to design a mechanical assembly of a plurality of physical objects by:
providing a directed acyclic modeling graph having nodes and arcs that model a mechanical assembly, the directed acyclic modeling graph capturing design characteristics of the mechanical assembly, the mechanical assembly being formed of a plurality of physical objects, the directed acyclic modeling graph representing a hierarchy between physical objects of the mechanical assembly, each physical object being a part or a set of parts of the mechanical assembly, the directed acyclic modeling graph serving as a model representation of mechanical links and relative positionings of different parts of the mechanical assembly, each node representing a respective physical object of the mechanical assembly, and each arc representing a use of a physical object by another physical object in the mechanical assembly, for a given arc, the given arc representing a respective physical object represented by an origin node using a respective physical object represented by an end node, wherein a chain of identifiers corresponds to a path of arcs, at least one arc being uniquely identified by an identifier, the mechanical assembly being further modeled using tuples in the graph, by representing at least one design relation of the physical objects using a tuple containing a first chain of identifiers corresponding to a path of arcs between nodes representing a first physical object and a second physical object, said tuple representing a use sequence of the physical objects where the first physical object uses the second physical object in the mechanical assembly;

determining at least one mapping between the first chain and a second chain of identifiers, the second chain having an identifier in common with the first chain and substituting at least one occurrence of the first chain with the second chain in the tuple used by the at least one design relation, said determining and substituting automatically reflecting an update of the design characteristics of the mechanical assembly.

\* \* \* \* \*

UNITED STATES PATENT AND TRADEMARK OFFICE
CERTIFICATE OF CORRECTION

Page 1 of 1

PATENT NO.       : 8,798,975 B2
APPLICATION NO.  : 12/980694
DATED            : August 5, 2014
INVENTOR(S)      : Jean-Francois Rameau and Laurent Alt It is certified that error appears in the above-identified patent and that said Letters Patent is hereby corrected as shown below:

In the Claims:

In column 21, line 43, insert --computer-- before "processors:";

In column 21, line 45, delete "model" and insert --modeling--;

In column 21, line 51, delete "of" before "a set" and insert --or--;

In column 21, line 58, delete first occurrence of "a use of" after "represent";

In column 23, line 40, delete "in" after second occurrence of "node" and insert --of--.

Signed and Sealed this
Twenty-first Day of October, 2014

Michelle K. Lee
*Deputy Director of the United States Patent and Trademark Office*